(12) United States Patent
Beser et al.

(10) Patent No.: US 8,075,398 B2
(45) Date of Patent: Dec. 13, 2011

(54) INDEPENDENTLY-DEFINED ALTERATION OF OUTPUT FROM SOFTWARE EXECUTABLE USING DISTRIBUTED ALTERATION ENGINE

(75) Inventors: James Beser, San Francisco, CA (US); Ofer Rundstein, Jerusalem (IL); Hillel S. Rom, Ben Zait (IL)

(73) Assignee: Double Fusion, Inc., Santa Monica, CA (US)

( * ) Notice: Subject to any disclaimer, the term of this patent is extended or adjusted under 35 U.S.C. 154(b) by 634 days.

(21) Appl. No.: 12/194,757

(22) Filed: Aug. 20, 2008

(65) Prior Publication Data

US 2009/0054140 A1    Feb. 26, 2009

Related U.S. Application Data

(60) Provisional application No. 60/956,837, filed on Aug. 20, 2007.

(51) Int. Cl.
*A63F 9/24*    (2006.01)

(52) U.S. Cl. ............... 463/31; 463/32; 463/33; 463/34; 463/40; 463/41; 463/42

(58) Field of Classification Search .............. 463/30–34, 463/40–42
See application file for complete search history.

(56) References Cited

U.S. PATENT DOCUMENTS

| | | | |
|---|---|---|---|
| 6,625,578 B2 | 9/2003 | Spaur et al. | |
| 2002/0004743 A1 | 1/2002 | Kutaragi et al. | |
| 2002/0004855 A1 | 1/2002 | Cox et al. | |
| 2004/0127284 A1* | 7/2004 | Walker et al. | 463/30 |
| 2004/0148221 A1 | 7/2004 | Chu | |
| 2004/0194069 A1 | 9/2004 | Surasinghe | |
| 2004/0219977 A1* | 11/2004 | Ebisawa | 463/31 |
| 2004/0242327 A1 | 12/2004 | Shahar | |
| 2004/0248649 A1 | 12/2004 | Arai et al. | |
| 2006/0105841 A1* | 5/2006 | Rom et al. | 463/42 |
| 2006/0128469 A1 | 6/2006 | Willis et al. | |
| 2006/0247039 A1 | 11/2006 | Lerner et al. | |
| 2007/0061201 A1 | 3/2007 | Ellis et al. | |
| 2007/0129990 A1 | 6/2007 | Tzruya et al. | |

FOREIGN PATENT DOCUMENTS

WO    WO2005/086969 A2    9/2005

OTHER PUBLICATIONS

International Search Report and Written Opinion, PCT 2008/073669, International filing date: Aug. 20, 2008.
International Search Report and Written Opinion, PCT 2008/073428, International filing date: Aug. 18, 2008.
European Search Report, dated Nov. 23, 2010 Re: Application No. EP 08 82 7857.
Supplemental Partial European Search Report, dated Aug. 31, 2010 Re: Application No. EP 06 85 0782.

* cited by examiner

*Primary Examiner* — Omkar Deodhar
(74) *Attorney, Agent, or Firm* — Connolly Bove Lodge & Hutz LLP; Jonathan A. Jaech

(57) ABSTRACT

A first executable, such as a computer game, operates coextensively with a second independently operating executable that monitors events on a client operating the first executable. The second executable determines actions to be performed in response to monitored events, as defined by a business logic table. The second executable traps API calls to perform actions altering apparent output of the first executable. The business logic table may be distributed to the client separately. The second executable and the first executable may be configured to execute during the same times on the client node. The second executable may be used to provide additional content, including advertising, in the context of an existing game or other software executable.

14 Claims, 16 Drawing Sheets

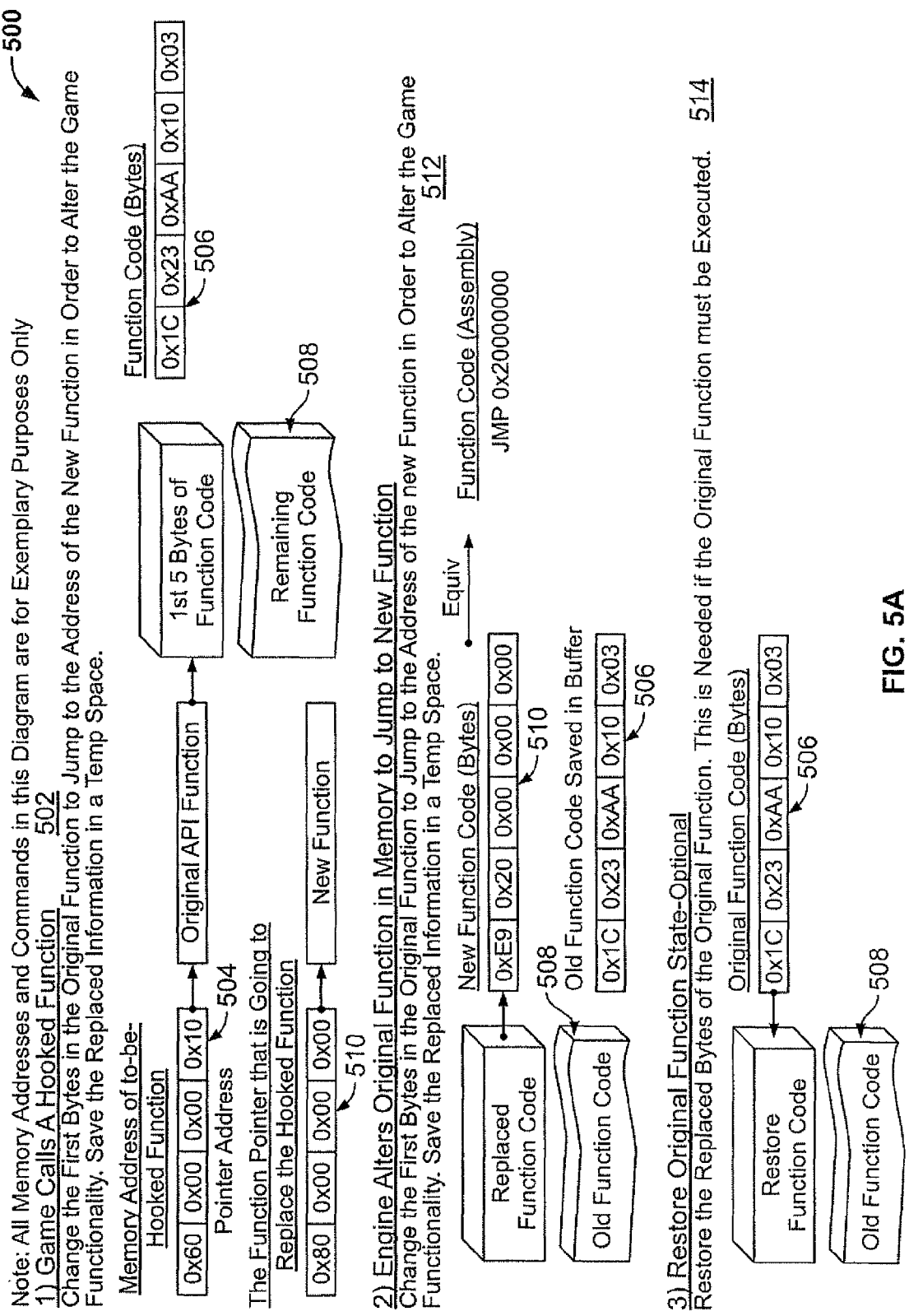

INDEPENDENTLY-DEFINED ALTERATION OF OUTPUT FROM SOFTWARE EXECUTABLE USING DISTRIBUTED ALTERATION ENGINE

CROSS-REFERENCE TO RELATED APPLICATION

This application claims priority pursuant to 35 U.S.C. §119(e) to U.S. provisional application Ser. No. 60/956,837, filed Aug. 20, 2007, which application is specifically incorporated herein, in its entirety, by reference.

BACKGROUND

1. Field

The present disclosure relates to alteration of original output from a software executable to provide altered output, according to an alteration scheme that is defined independently of the software executable and distributed as a separate alteration engine.

2. Description of Related Art

Various computer programs for providing an interactive video display on client computers, for example interactive game programs, are known in the art. Advertising can be inserted during play of such games by programming a function in the game that calls advertising material from a designated source during game play, so that the advertising appears during play of the video game. For example, advertising may be made to appear on a modeled billboard that is present in a modeled video game environment. The advertising content may be called at runtime from a designated, updateable source and may therefore be updated after the game program is distributed.

The use of advertising or community messaging in the context of game play is recognized as a way to generate ongoing revenue by selling space to sponsors for ads displayed to an established base of game users, or by promoting other revenue-generating opportunities through game play. In addition, the value of a particular game may be enhanced by the addition of community features, such as achievements, tournaments, messaging, and other features that facilitate greater social interaction between remote game players, thereby adding to the interest level provided by game play, which, in turn, can increase the amount of game play and the duration for which user interest in the game is sustained, as well as attract new users.

Notwithstanding these advantages of updateable advertising and other forms of communication in a game environment, prior methods of adapting such features for game play are subject to certain disadvantages Prior methods generally require that the desired functionality be designed into the game itself, and become part of the executable game code. As such, the communication modes cannot be changed except by downloading and installing a new game version. In addition, considerable effort may be expended in providing updateable communication features to a particular game, thereby adding time, cost and complexity to the game development process and increasing the investment required to develop a game. Also, development and publishing of software, including game software, may be performed by different entities between which communication and coordination are impaired, at least to some degree. It may be therefore difficult to incorporate functionality desired by the software publisher during the software development stage. And once the software has been developed and released, changes may be even more difficult to accomplish.

It is desired, therefore, to overcome these and other limitations of the prior art, and to provide new methods and systems that may be applied in new and unexpected ways to enhance user interest and participation in game play.

SUMMARY

The present disclosure relates to independently-defined alteration of original output from an executable software application to provide altered output according to an alteration scheme. The software, for example, an executable computer game, is configured to produce original output in response to user inputs when operating in a specific hardware environment. The software may comprise an executable file that is compiled from a higher-level language and recognized as executable by a computer operating system, or as other discrete static code, e.g., binary code, that is executable in the applicable hardware environment. The software is therefore in executable form, and may sometimes be referred to herein as an "executable." The original output may comprise, for example, audio, video, or electronic output from an output device connected to a processor that is running the software executable. The software executable may be configured to cause specific defined output in response to user input. For example, in response to user input from a joystick, the executable may cause a rendered sprite or avatar to move in a direction indicated by the joystick input in a modeled game environment, which is then rendered as output by a graphics engine and displayed on a display screen. The software executable may be designed to operate in stand-alone mode, for example, to provide game play on a client node without requiring real-time or near realtime communication with a remote node. The software executable may also function in a networked multiplayer mode, in which real-time or near real-time communication is performed with one or more remote nodes.

The alteration scheme may be defined independently of the software executable after the software executable has been published in a particular version. As a published version, the executable comprises a discrete static body of encoded information, such as, for example, an executable file. To "define independently" means that while the software executable is already defined and static, and the alteration scheme is defined in a separate, independent process that operates independently of operation of the software executable. However, the process for defining the alteration scheme may use the software executable, or some representation of the software executable, as input or reference data. Therefore, the alteration scheme may be developed and applied independently of development of the executable, thereby permitting, for example, separate development of the game and alteration scheme. The alteration scheme may be developed and applied anytime after the executable is developed, including after the executable is released to the public in final form.

The alteration scheme maps original events from the executable to specified altered outputs. Original events may include, for example, Application Program Interface (API) calls to graphic or audio rendering systems, calls to the Operating System (OS), receipt of defined inputs, such as from a keyboard or game controller, a state of graphic memory, elapsed time, exceeding a game score, or any combination of the foregoing. When a defined event is detected, a client-side alteration engine launches a predefined action that alters output from the software executable. For example, the alteration engine may present information overlaid on game graphics such as commercial videos or in-game messages, overwrite creative information in the executable memory spaces with new creative information, play an audio track, record user tracking information, or other desired action.

The client-side alteration engine may be installed on the client after installation of the game executable for which it is designed, such that when the client receives input requesting that the game executable be executed, the client first initializes and loads a client-side alteration engine DLL, and then calls the game code. The alteration engine may then monitor the client machine state during operation of the original game code to detect trigger events. When a trigger event as defined by the alteration scheme is detected, the alteration engine refers to the alteration scheme to identify an action triggered by the event. The alteration engine then causes the action to be carried out. The alteration scheme may be contained in one or more data files separate from the executable code running the original executable and alteration engine. In this way, the alteration scheme may be updated without requiring an update of executable code.

The technology described herein may be employed as a way to add additional features, updates, and advertising to software distributed for entertainment and other purposes, for example, for video game play. After the game (or other) software is completed, it may be made available to a post-development process in which the alteration engine is made to react appropriately to defined game states in the manner described above. The alteration engine may then be encrypted for copy protection, and distributed to clients independently of the game itself, and can be installed on the client machine either before or after the associated game is installed. Optionally, end users may be provided with incentives for installing the alteration engine on their respective clients. Once installed on a client, the alteration engine may remain dormant for as long as desired, having essentially no impact on operation of the related game application unless and until an alteration scheme is defined and provided to the client nodes on which the alteration engine is installed.

The present technology therefore enables novel methods of distributing advertising and other information to distributed client nodes operating a game program. The game program generates a video output on client display devices which functions as a video interface, through which users visualize the operating state of the game. The operating state of the game, in turn, depends on input from one or more players and predefined rules and data used by the game program. According to one such method, binary code for an alteration engine is developed and distributed to client nodes after the game executable is defined. Separately from the alteration engine, an alteration scheme may be developed and automatically distributed to the client nodes, such as via a network connection. Alteration data used to fulfill the alteration scheme may likewise be distributed, including advertising data for video output. Either or both of the alteration scheme and the alteration data may be modified as desired and distributed to numerous clients. The content of advertising that appears during the game, and when or where it appears during the game, may thereby be modified or updated at any desired time. The advertising thereby appears as additional or alternative video data in video output during game play, and can be updated as desired, independently of development of the game application itself.

Nor is the technology limited to advertising applications. The technology described herein may be used to dynamically track and/or alter a users experience with a video game based on the detection of complex events read from myriad game I/O. This technology interprets video game behavior as a complex event stream and uses it as input to client-side dynamic business logic that triggers in-game actions. This novel technology approach may be used to provide advanced monetization and community-building features in games, without any need to integrate functions into the source code, contrary to how such features are facilitated in prior-art games. These advanced features may be implemented without any access to source code for the underlying software executable.

Specifically, the described methods and systems may be used to detect events from various information streams caused by execution of the software executable and user input at runtime. Exemplary events may include, but are not limited to:

1. The presence of one or a combination of graphical or audio-related game objects, such as textures, geometry, audio streams;
2. The value of any reference data such as game score, health, etc.;
3, Properties of the graphical output; or
4. The use of peripheral devices such as mouse, keyboard, webcam, microphone, etc.

Such events are recognized as triggers for defined actions according to dynamic business logic, which may be downloaded to the user at or before runtime. Exemplary high-level action types may include, but are not limited to:

1. In- and around-game advertising;
2. In-game community features, such as high score detection;
3. Game-in-a-game functionality, for example, dynamically adding hidden items in the game environment for user to find; or
4. Advanced game analytics.

By avoiding the need for source code integration with the underlying game or other application, the present technology may be used to minimize the cost, complexity and time of software development and publishing, making it easy for software publishers to add features that benefit the end consumer. The methods and system described herein also enable the monetization and enhancement of already developed games where modification to the source code is no longer possible.

The present technology provides that the business rules that govern operation are not hard coded in the engine, but rather are governed by a set of parameters, which may be delivered, for example, in flat configuration files that are swappable at any time via a data connection to the client node where the game or other software is installed. This ability to update business rules from time to time is referred to herein as "dynamic" rules implementation. In other words, events-to-action mapping may be changed at various times after a game is installed on a client node, without requiring updating of the software executable file. This is unknown in the field of game software, and may be regarded as a most unexpected breakthrough.

In a similar fashion, any new creative content used as a result of an action (such as, for example, new textures or geometry) may also be made changeable at any time. Changes to creative content may be targeted according the user's context (for example, time of day, day of week, etc.) or demographic information (for example, gender, age, etc.). Using the methods and system as described herein, a game publisher or agent may update configuration files that control "business logic" that interprets the event stream produced by the game and triggers actions to alter the behavior of a game post-launch. These configuration files may be posted server-side for download by the client application. Once downloaded by the client, the entire behavior of the engine can be altered in this way with no vestigial behavior from the previous configuration.

A server such as used to distribute configuration files may also be used to aggregate information extracted from several game instances running on different clients, using the described technology. The information may then be applied at a host level to facilitate community features. The client engine may send information about the progress of the user in a specific game, for example, levels completed or high score reached, to a remote server database. This information may then be presented in the form of score or leader boards, achievements lists, or other postings, using HTML web pages, web servers, unified database technology, and other network communication methods as known in the art.

Another useful application of the methods and system described herein is post-launch configuration of creative and advertising content. Creative or business decisions—for example, where to put ads, the contents of an ad hoc tournament, what achievements are worthy of reward, etc.—may be delayed until after distribution of an original game to the end user. This creates the opportunity to postpone or revise the creative decisions which, because games and other forms of entertainment software can be very complex, are often a large driver of integration time, complexity, and cost. Such creative decisions, which may also include or affect business decisions, may therefore be delayed until after software release, when more information may be known about the advertiser and gamer market dynamics. A game title (and especially high-end "AAA" titles) may take 2 years or more to develop, thus making certain creative decisions so far in advance very difficult. Also, relatively few releases achieve widespread popularity, and so doing all the work upfront on many releases may mean much wasted effort for games that are played by relatively few users. Thus, the method and system described herein may shorten pre-launch time and reduce the associated cost burden of enabling games with advertising or community technology, in addition to its other potential benefits as described above.

A more complete understanding of the present technology and methods will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

FIGS. 5A-B are diagrams illustrating exemplary steps of a method for replacing an API function originating from a game executable with replacement content.

DETAILED DESCRIPTION

Figure 1:
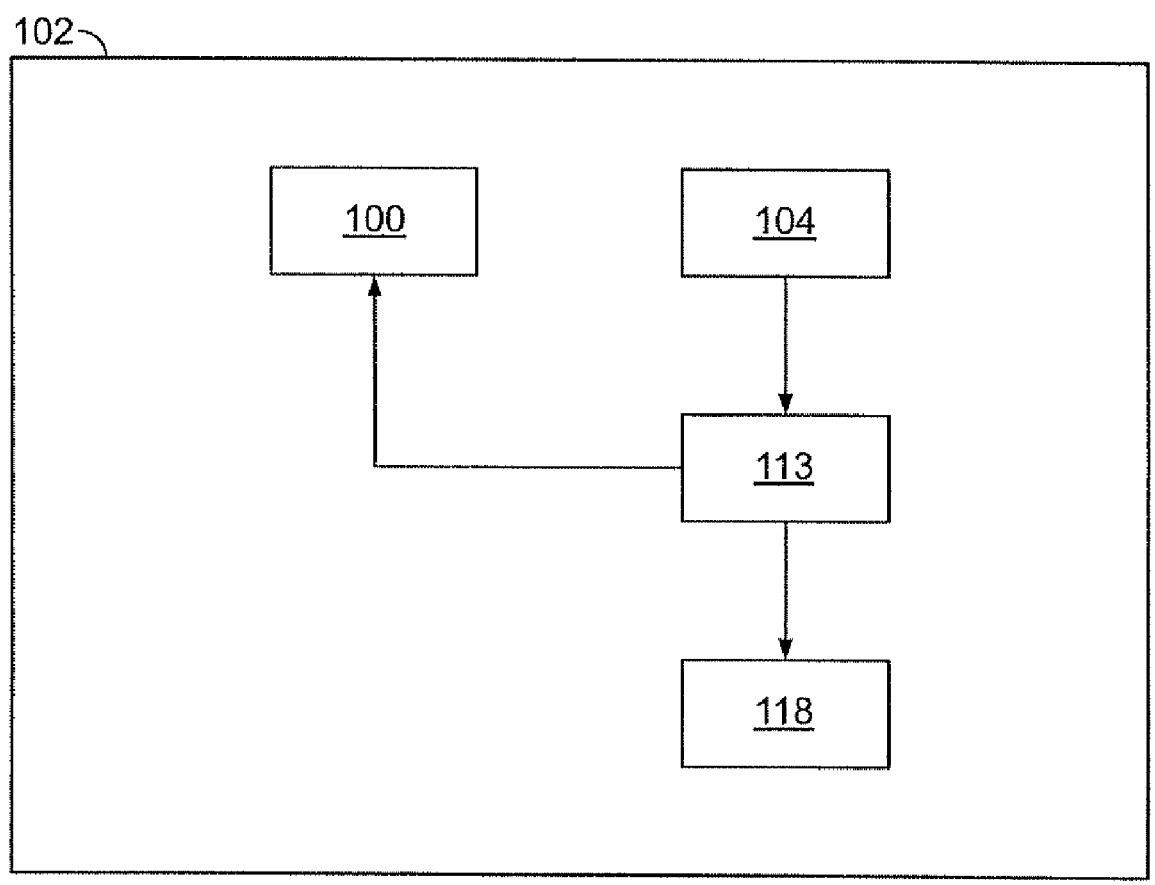
FIG. 1 is a diagram showing a software executable, such as a game program, cooperatively installed with an alteration engine on a game client, according to technology described herein.

The present application describes different novel features for independently-defined alteration of output from a software executable, such as a computer game. Primary features are outlined in the section immediately below, and described in more detail in the remainder of the description. Each feature may be combined with other features of the technology, and one or more features may be implemented independently of other features. Although the present description references operations using a game or game executable, it should be apparent that the concepts and technology described herein may be applied to other types of software executables, as well.

I. Smart Client-Side Alteration Engine Technology
   a. General:
      i. Development of an alteration engine configured to operate with a finished game or other software executable as an apparently seamless part of the executable as experienced by the user.
      ii. Ability to delay, change or update the development of advertising or additional game features until after market adoption is known.
   b. Event Stream: As used herein, an "event stream" is game output on a client node, including any client activity caused by operation of the game engine in response to user input. The event stream is processed by a client-side alteration engine to perform functions described below:
      i. Detecting presence and usage of inputs into game, for example, mouse, keyboard, joystick, speech, or other inputs.
      ii. Analyzing and detecting output of a game process, for example, outputs directed to a graphics card, sound card, or OS (operating system).
      iii. Monitoring memory locations that correspond to in-game objects and perform tests so that the specific creative objects may be indexed.
      iv. Use of an "event stream" from a game or other executable process as input into dynamically downloaded business logic.
      v. Use of any defined event or logical (e.g., Boolean) combination of events to define game states or events. Events in a combination may be limited to those occurring within a configurable time tolerance. For example, Events 'A' and 'B' must occur within 2 ms of one another to trigger Action 'C'.
      vi. Sampling a hardware or software back buffer to detect certain graphical properties to define game events (for example, level breaks).
      vii. Discerning the location of, and subsequently monitoring, game reference values (i.e. score, health, etc) and updating according to business logic.
      viii. Detecting whether a game object is moving or animated.
      ix. Detecting virtual camera proximity to an object or the distance between 2 objects on screen.
      x. Detecting collision between the camera and an object or between two objects onscreen.
      xi. Detecting an object's size on screen, for example, percentage of screen area or number of pixels occupied.
      xii. Detecting the viewing angle of an object to the camera.
      xiii. Detecting if an object is onscreen and not occluded.
      xiv. Detecting the presence of specific objects, textures, or geometry in a scene.
   c. Dynamic Business Logic:
      i. Business logic that governs the behavior of the client technology may be contained in small configuration files configured for downloading from the Internet or other wide area network, which can be distributed to client nodes at any time. This configuration may be used to make game engine operation changeable at any time (assuming at least intermittent connectivity).

ii. Targeting dynamic business logic according each client's specific context, for example, location, time of day, day of week, etc.

iii. Delaying certain creative or business decisions (for example, selected portions of in-game advertising and community feature enablement) until some time after game release, or changing such decisions after game release, thereby enabling a centralized response to 'just-in-time' to gamer and advertiser market demands and postponing development expense.

d. Actions to be implemented by client-side alteration engine during game execution, in response to the event stream and using predefined business logic:

i. Overwriting memory locations for in-game objects (e.g., textures and geometry) to swap in other creative information for display in the game.

ii. Detecting and recording the occurrence of events in one or more tracking files for subsequent uploading to a supporting server.

iii. Adding or modifying animation or motion of new or existing objects.

iv. Modulating sound based on an object's distance from the camera ("3D sound"); for example, the volume at which an audio advertisement is played depends on how far away a game object is from the client's camera perspective.

v. Changing operation of global game controls, for example "pause," "exit," etc.

vi. Changing the value of game reference values, for example, player score, "health," weapons, etc.).

vii. Adding new objects, including new textures and geometry, to a game and tracking game performance with the new objects.

viii. Drawing information, including advertising messages, over the game graphics.

ix. Detecting the presence of a custom mouse texture, and ensuring that a custom texture always shows over all native and new graphical information.

e. Host-Level Functions:

i. Hosting and distributing configuration files that govern business logic on the client.

ii. Accepting tracking files uploaded from client and placing in tracking database.

iii. Selectively targeting business logic down to the individual user level based on demographic data, user preferences, inferred user characteristics, client location, client time-of-day, or other personal characteristics.

iv. Aggregating information collected from distributed game clients into a centralized user interface for gamer consumption.

v. Assigning a points-based system to in-game events, and aggregating point scores in a central database for display to a community of gamers.

f. Configuration Tool for Alteration Engine: software tools are described for configuring the alteration engine. These tools may have capabilities and functions including but not limited to those described below:

i. Facilitating marking of game textures for use as potential ad spots or as anchor points for additional geometry directly inside the game during game play.

ii. Defining events or combinations of events for linking to business logic actions.

iii. Manipulating new geometry in an easy-to-use user interface that outputs offset coordinates for new objects.

The methods and system described herein may be applied to implement solutions in in-game advertising markets, optionally using community enablement strategies to leverage effectiveness of in-game advertising. For example, users that fill out an advertiser-sponsored form may be awarded more points, health credits, weapons, accessories, or other benefits that derive their value from the context of game play. Information thus gained may be used to serve the in-game analytics market for publishers, portals and developers. The technology may also be used for game content management, as it allows content updates after a game is in-market, for example, keeping the in-game music up to date over time.

The following scenario illustrates an exemplary application for the present technology. A Beverage Company is able to embed hidden three-dimensional modeled bottles of beverage throughout a game, or network of games, which when found by a user qualify them for some prize. To enable this functionality, the following steps are taken:

1) Making the business/creative decisions around where to place the modeled bottles of beverage within the game environment. These decisions may be made by a marketing representative of the Beverage Company familiar with the particular game or games being employed.

2) Identifying "anchor" objects (e.g., game textures and/or geometry) in all game scenes where the beverage bottle is to be placed in a released version of the game. This may be performed at any time after the game executable is fully developed, including any time after release to the public. Identification of anchor objects may be done by a game administrator or specialist at the host level, herein called an "Operator," using configuration tools as described herein.

3) Based on the identified anchor objects, the Operator may set an offset (e.g., x, y, z offset in the game environment) from each anchor object where the object would reside and also a specific orientation for the object, using the configuration tools. This may be repeated for each placement of the beverage bottle in the game.

4) The configuration tool may generate configuration files that are posted at a host location, which implement the foregoing changes. When the game is run at the client nodes, the alteration engine obtains the files and updates its event/action mapping accordingly. The client executable may be distributed to the clients with the appropriate configuration files, or the configuration files may be downloaded at run time.

5) When the game runs on each client having the updated configuration files, and an anchor object is detected by the engine (i.e., an "event" occurs), the engine may make extra graphics API calls to place the beverage bottle object in the appropriate location as defined by the anchor object and offset (i.e., an action is performed in response to the event).

When or if a game avatar operated by a user comes in contact with this beverage bottle object (i.e collides or touches) in the game environment, than the engine may detect this event and trigger a predefined action, for example, sending the user's information to the appropriate place for a prize to be awarded, such as a merchandise discount coupon. Specific client-side details of how this may be performed using the present technology are described herein below. Responsive components at the host level may be developed and implemented without undue experimentation by one of ordinary skill.

Client-Side Technology

The client-side technology, through the specific processes described in this section, may be used to analyze output from a video game or other executable during execution thereof as an 'event stream' that serves as input to dynamic business logic which, in turn, triggers in-game actions that alter the apparent response of the game to user input or perform additional operations that may or may not be apparent to the end user. This capability is provided by a client-side engine that operates cooperatively of the game executable but independently of it. The client side alteration engine may be configured to operate with a particular game executable using a configuration tool, at any time after the game executable is developed. The alteration engine may be distributed to the client device with the game executable, before the game executable is installed on the client, or after the game executable is installed on the client. Once installed on the client, the alteration may be updated to operate with new games, or to operate in new ways with games.

The alteration engine may be configured to hook into the games it recognizes, and ignore operation of other games or software for which it does not recognize a hook. Once hooked into an application, the alteration engine performs alterations of output as described in more detail below. The alteration engine may be configured as an independent program capable of being installed and run on the client machine independently of any game and at any time. For example, the alteration engine may be downloaded to various clients as an application separate and apart from the games or other applications that it is configured to alter. One such alteration engine on the client machine may be configured to alter output from a plurality of supported games.

An alteration scheme defining mapping between game events and actions taken by the alteration engine may be developed using a software development tool as described herein. The tool may output an alteration scheme for a particular game. The alteration scheme may be transmitted at any time to a client on which the alteration engine is installed. Thus, when the alteration engine detects the game for which the alteration scheme has been developed, it may operate to hook into the game whenever it operates and apply the alteration scheme to alter the game output. An updated list of games supported and alteration schemes for each may be delivered to the client via a server from time to time, for example, on request from the alteration engine, pushed from the server in response to an event, or on a periodic basis. The game itself may remain the original game without any changes. It may be installed on the client by the user independently, before or after the alteration engine is installed there.

On the client machine, once the alteration engine recognizes that a known game (a game on the list) is run in the client, it will hook into it and perform alterations as described herein. Thus, the alteration engine is not integrated into the executable file of the game on disk, but may be integrated into the game's runtime image in memory, every time it is run.

Trigger 'Events': As used herein, "events" are changes in machine state that happen at a client node resulting from operation of the game, that are detectable using an independently operating engine on the client node, via one or a combination of input output (I/O) for the game at runtime and occurring within a configurable time window. For example, a change in machine state such as objects rendered in the same frame or within a specified time tolerance (for example, within 1 ms).

Event detection using an engine operating independently of the game executable should be understood as distinct from detection arising within the game executable itself. In this sense, operating "independently" means that no provisions are made in the game executable for communicating the occurrence of events to an external process, including to the concurrently-operating alteration engine. So far as the game executable is concerned, it is as if the external alteration engine does not exist. Conversely, if event detection is integrated at a source code level with the game code itself, it is trivial to accomplish. When integrated with the game source code, the game executable may easily be configured to notify an external engine of anything that is occurring in the game context with absolute certainty, via an API or other, equivalent types of communication. However, source code integration may be undesirable or impractical for reasons explained herein above.

Therefore, the process and technology described herein provide an external engine with the capability to independently detect—as it were, to "infer"—the occurrence of predefined events caused by operation of the game executable. This can be done with a high degree of certainty by trigger actions or a combination of same, which can have a Boolean relationship. For example, if the game makes an API call to the graphics API (i.e. Directx™, OpenGL™, etc.) to load a texture into the graphics card from disk to a memory buffer for subsequent usage in the game, the external engine may interpret this action by the game code as a reliable signal that the game has just, or is just about to, display a particular scene, and therefore initiate a predefined action.

The power and flexibility of this capability will become more apparent when one considers that games are complex software programs that generate myriad events during a run, and that a Boolean relationship between two (2) or more 'events' can be made to describe game states more granularly. Considering these two factors, almost any part of a game can be enabled for triggering insertion of advertising and/or community features. For example, a level break event may be inferred by the presence of a few concurrent sub-events seen in close proximity such as the loading of textures specific to the level break (i.e. loading a status bar), a call to the OS for a new map/tile, a call to the OS for music that only plays during a level break, and so forth.

The better illustrate the myriad event types available to an the external alteration engine for detection and use as triggers for predefined actions, the following lists exemplary event types that may be detected:

1) the presence of multimedia API calls from the game to the graphics and sound APIs;

2) the presence of calls to the OS or other functions the game requires at runtime for normal operation;

3) game inputs like use of peripherals, keyboards, hotkeys, mouse, and so forth;

4) the use by the game of one or a combination of objects (texture/geometry) as detected by the engine;

5) global parameters like elapsed time since game boot;

6) the presence of certain graphical properties in the graphics buffer(s);

7) the value of any reference data held in memory like health, score, etc., compared to some predefined value (i.e. score >=100 k);

8) interaction among objects such as, for example, proximity and collision;

9) tracking information for an object such as, for example, size on screen, angle of incidence to the camera, duration on screen or any combination of the aforementioned to create a minimum or maximum threshold for exposure time;

10) content of a specific area in the screen video buffer, such as may be determined, for example, by sampling one or more locations on the screen and comparing to predetermined graphic samples; and 11) a combinatorial relationship of any of the above to create complex relationships that can define game 'states'.

More details concerning technology for enabling detection of game events without source code integration are described in the section entitled "Overview of Runtime Client-Side Technology," below.

Client-Side Alteration Engine Actions

Once a game event is detected the client-side engine may launch a predefined action. While there is no limit on the business applications that may drive the sort of actions that can be made, given the state of the gaming industry today, those actions may be most commonly related to:

1) Advertising;
2) Sponsorships;
3) Community features,
4) Ad-Hoc Tournament creation capability;
5) Game content management systems that allow the publisher to change game features, maps, levels, look and feel, and so forth after the game is in market without the need to do a full patch or alter the source code (for example, if post-launch feedback from the game community is that a game is too difficult, the publisher could use this invention to give gamers more health on a moving forward basis); and
6) Game analytics to report on how games are played by the end gamer, such as reporting that can be used to inform future game development or be used in conjunction with the content management system described in the previous application.

The types of granular actions that can be taken by the alteration engine may include, but are not limited to:

1) Pausing the game;
2) Presenting information over the game graphics like commercial videos or in-game messages;
3) Overwriting object creative information in memory with new creative information;
4) Overwriting reference data in memory, like the user's score or health;
5) Adding new objects (texture/geometry) to the scene;
6) Adding new sound to the game;
7) Modulating sound based on a user's proximity to a reference object;
8) Writing tracking information to a log; and
9) Minimizing game and launching a web browser to a specific URL (e.g. by inserting a click-through ad on a game screen).

The following example concerns an action that may be performed by an alteration engine during game run time related to in-game advertising. A common and required game operation is the setting of textures in memory via a call to the graphics API (e.g., Directx™). This graphics API call may be the event, and the action it triggers may be to overwrite the corresponding memory buffer with a new advertiser-specific creative. Another example is if the memory location of the score for a game is known, this value can be constantly read by the engine and, should it exceed certain amount (occurrence of an excess score defining the event), the score and a unique identifier for that user may be transmitted to a central server, which may write the score and associated player data to a 'High Score' area for all who play the game to see. For more information, see discussion of the Overwrite Memory module presented below in connection with FIG. 3.

Note that actions do not necessarily need to be apparent or recognizable to the user at the time of performance by the alteration engine. For example, actions may be for reporting purposes only for a game publisher, for example, for tracking how many users unlock "Easter Egg" (hidden) content or achieve certain game objectives.

Process by which a Game is Enabled with Alteration Engine Technology

An essentially two-stage process may be used enable a game with the presently described technology. These stages may be performed at the same time or with an unspecified delay.

Stage 1: The first stage may be to enable all the client machines with the alteration engine. In order for the technology to work in the context of the existing game code, the alteration engine should be installed on the client so as to run in the background during execution of the game's process code. The use of an independent alteration engine has the advantage of permitting separate distribution of the alteration engine code to client nodes after the game code is already distributed to the client. Also, the alteration engine may be made operational without requiring binary manipulation of the game executable.

FIG. 1 is a diagram showing the software executable 100 in relation to a distributed alteration engine 118 according to technology described herein. When the alteration engine is installed in client memory 102, a start-up program 113 that is configured to operate in response to booting-up the client system may be configured with a link to the alteration engine 118. Thus, when a user boots up the client, the start-up application 113 initializes the alteration engine 118, causing it to run in the system background. In background mode, the alteration engine may monitor system activity to detect start up of any game that the alteration engine is configured to alter. Once startup of an alterable game is detected, the alteration engine operates to detect events and initiate actions during game play, thereby "hooking" functions of the game executable.

Stage 2: definition of game-specific business logic and creative parameters. Once the 1st stage is complete, a game may then be enabled with the technology and only then requires its operating instructions—referred to herein as the dynamic business logic. This business logic may be contained in small flat script files (for example, encrypted XML files) that lend themselves to quick transmission over the Internet. The construction and distribution of these configuration files is the purpose of this second step, and can be performed at any time or at multiple times, even after the game has been downloaded to a user's machine. If these configuration files are swapped out (e.g. re-downloaded from server), the game will operate under the new rules without any residual behavior remaining from the prior configuration. Also, the configuration files may be configured or omitted, causing the alteration engine to operate in a default mode. In some embodiments, no changes to game outputs are evident when the alteration engine is operating in default mode.

Defining the dynamic business logic: marketing and business requirements may be primary drivers for definition of dynamic business logic. The tools used to author this business logic can take many forms, from direct authoring/editing in a text editor, presumably by a technical resource, to complex graphical interfaces meant for non-technical people to perform the same output. No matter what the format, the main functions performed during definition of dynamic business logic are identification of events of interest, definition of resulting actions to be performed by the alteration engine, and codification of these events and actions in a language or data format that is interoperable with the alteration engine. The following is a non-exhaustive list of exemplary types of tasks performed in a tool for defining business logic:

1. Picking game objects (such as textures, geometry batches) that may be replaced by different objects (such as ads). Note that this process may be iterative (change over time) and can be set differently for different geographical locations.

2. Identification of game states used to define events, including marking one or more game objects that identify a specific state in the game. One or more responsive actions can then be linked to specific events. For example, should object A, B and C be detected concurrently (the Event), the engine may pause the game (Action 1) and display an advertising object on screen (Action 2) in a specific location (i.e. on the main menu of the game).

Non-technical business and creative requirements may need to be defined before an operator enables a game with the proposed technology. Exemplary requirements may include, but are not limited to:

1. Identifying optimal locations for dynamic advertising in the game environment;

2. defining particular characteristics of specific advertising campaigns;

3. identifying results and user behaviors occurring during game play that may be of interest for reporting purposes to a host location;

4. identifying results and user behaviors occurring during game play that should trigger additional community features, for example, when the users score exceeds a certain value; and 5. defining the amount of benefit a certain event should yield, for example, how much to increase the health score of a player if a dynamically placed object is found.

More technical and creative decisions may include, but are not limited to:

1. determining placement, size, transparency, animation, user response capabilities and creative refresh intervals of in-game advertising textures and geometry;

2. determining placement, size, transparency, animation, user response capabilities and creative refresh intervals of around-game advertising textures and geometry drawn on top of the game graphics;

3. determining size of any new objects written into a scene and the offset coordinates (from existing objects) for any new objects added to a scene to make sure the inserted object will have the desired appearance; and 4. determining parameters that may govern dynamic advertising functionality, such as creative rotation frequency or transparency.

Defining Event Stream: Likewise, determination of dynamic business logic may include defining the events that trigger various actions. There are many different types of events that an operator of the system may use as a trigger, on its own or in combination with other events. Exemplary events such as an operator of the proposed system may define are discussed below in a description as to how a tool could facilitate this task. Further insight into development and use of a tool for configuring dynamic business logic is provided in the final section, titled "Run Time Integration Tool."

Various functions and steps that may be used in defining dynamic business logic are discussed below. One such step may be described as marking objects used to indicate the presence of a machine state that signals occurrence of a triggering event. In this step, the operator may find objects of interest (for example, textures or geometry) and mark these objects for future runtime identification. Objects of interest, for example, may be those objects that will either be potentially overwritten at runtime with new creative information, or may be reference objects that serve as a trigger and as an anchor point for new objects written to the scene by the engine. For the latter, offset coordinates may be defined a few different ways: 1) by an operator's subjective decision about the location that looks most appropriate; or 2) by making placement decisions with respect to multiple anchor objects. For example of the latter, an operator may specify that a 3D car model may be placed in a scene relative to 3 different objects. The first object may be, for example, the geometry patch that defines the ground or pavement. By setting a zero (0) distance offset over the ground, the operator may ensure that it the car doesn't appear to float above it. The operator may identify additional anchor objects and offsets in a similar way to achieve a placement that looks appropriate according to business goals.

Object identification, for any purpose, may be done by using a separate configuration application that runs while the game is played. The configuration application may be configured to facilitate visually-driven marking of locations on screen that correspond to an object of interest. Each graphical object in the game (texture, geometry batch) may assigned a unique ID by the configuration application. The unique ID may be calculated by performing a hash function on all or part of the object data.

The business logic definition tool may offer several ways to find the ID of a specific object, depending on the object type. In the case of a texture object, the tool may display the texture unique ID on the texture itself to an operator of the tool set, cycle through a display of the textures until the requested texture is highlighted and can therefore be selected by an operator of the tool set, or using a turn selection mode. In turn selection mode, the operator is provided with a special cursor, for example, a box or other outline that may be positioned on the requested object. The tool then automatically finds ID's for textures positioned under the cursor. Finding the ID's may be performed by changing each texture used in the current frame and testing the frame buffer (in the area under the marker) for the texture that changed the pixel buffer the most.

The operator may also mark certain game screens so that they may be identified during game runtime at the client level by the alteration engine. One way to facilitate such marking of screens is to define a screenshot (or equivalent) from operator input to the definition tool. Subsequently, the operator may use the tool to identify several portions of such a screen that uniquely identify it in the game. This may be done, for example, using a tool that allows the operator to define small (several hundred pixels for each sample should suffice) image samples at various places on the screen. These samples should be large enough to capture meaningful unique information, and small enough to minimize required information for reference at runtime, and thus provide optimal alteration engine performance. Such a tool may write the marked image file to a configuration file, or an equivalent encoding (encrypted) of the captured image samples, as well as the coordinates of same. During game runtime, the alteration engine may compare the game's graphics output, at the aforementioned coordinates, to the sampled images and determine whether a pixel-wise match, up to a configurable tolerance, exists.

Some games make use of a customized mouse texture that is specific to the game. Such customized mouse textures may be by detected by pattern matching at the location of the mouse cursor, which can be determined from the event stream. Once detected, the alteration engine may render any overlaid information (i.e., altered or inserted information that is drawn over the game graphics) before rendering the mouse texture. This ensures that the mouse pointer graphic doesn't appear to go 'under' any graphics drawn on the game by the engine.

Another step in defining trigger events may comprise identifying memory locations for reference data, such as game scores, player "health" status, weapons status, and so forth. Reference data may be monitored and marked as an event based on logical relationships. For example, an event may be defined as "Score>100 k." The alteration engine may periodically monitor the memory space where the score value is stored, and comparing the number information housed there against the criteria defined by the configuration tool.

Absent access to the game source code, which is not required to use the technology described herein, finding the appropriate memory location for game reference data may be performed using an iterative process, using a configuration tool. At each stage, the tool may search for a different value in a list of suspected memory addresses, starting from the complete memory space of the process. One example is to find the address of the player's score. The current score may be, for example, 10 points. The methods and system described herein will start looking for the value '10' in the entire memory space of the process. The result may be a list of hundreds or even thousands of suspected memory locations containing the value '10'. Game play continues and the player's score is now 30. The methods and system described herein will then look for the value '30' in the list of memory locations obtained in the previous iteration. The result again is a list of suspected memory locations, but this time the number of locations has reduced significantly. The process continues until the final list contains only one memory location which is the one being sought. The memory location for the particular data, for example, game score, is thus determined, and may be used to configure the alteration engine via a configuration file.

Other steps may comprise definition of any input or output from the game that may be of interest to define as an event. This may include, but is not limited to, any of the following:

1. The user depresses a certain key, or combination of keys, on the keyboard;
2. The game makes a request to the OS for file(s);
3. The game makes any graphical/sound API calls of interest beyond setting or loading of game objects;
4. The use of any non-keyboard/mouse peripherals, such as, for example, microphone, camera, joystick, and so forth.

After various events are identified, the operator, using the configuration tool, may set up relationships among several events, such as using Boolean or fuzzy logic, to define event combinations used to trigger actions. For example, a combination event may be defined by the presence of multiple specific textures on screen at the same time. This can help define a change of game state, which may be targeted at runtime as an action trigger. The operator may optimally set collars on the timing of such events. For example, the tool may permit the operator to specify that objects must appear in the same frame on screen, or that a series of events must be detected within a time tolerance (for example, within 1 ms), to cause detection of a combination event.

After events and combination events are defined, the operator may map actions to the events or combination events they have just defined. Generally, the tool may provide for a data structure or interface by which an operator may associate one or more actions to specific events or combination events, such as by using a relational database or data table containing records of event ID's and action ID's. Of course, the actions and action ID's need to be defined, as well. Exemplary actions are defined elsewhere herein. Some actions may be predefined due to frequent usage, these may include, for example:

1. Overwriting memory locations (i.e. overwrite texture information with a new creative, increment the user's score, etc);
2. Pausing game;
3. Overwriting mouse texture;
4. Creating new objects in the scene through new graphics API calls;
5. Writing information over the game display; or
6 Logging occurrence of event in tracking file.

The entire process of configuration may be optional, and thus, particular game titles need not be enabled for alteration at run time for any desired period, or ever. Until a particular title is enabled, the game may operate normally with no change to the user experience. However, the alteration engine may still be activated during run time, but will not alter the game output unless and until provided with the appropriate configuration file. Therefore investment in technology (e.g. Q.A.), creative content development (e.g., ad/community feature spotting) and project management (e.g. myriad approvals from all parties involved) may be delayed until a particular title has achieved sufficient popularity to justify the investment.

Overview of Run Time Client-Side Technology

Once the client-side alteration engine code is initialized and configured, it operates on the client to detect and "hook" the relevant API calls, according to one methodology employed by the engine. In this context, "hooking" or to "hook" means to replace a function in the memory address space of the game process with a different function. In most cases, the new function forwards the input to the original function and to the business logic to process the information. In order to maintain the expected game behavior, the final stage is for the engine to call the original hooked function.

Figure 2:
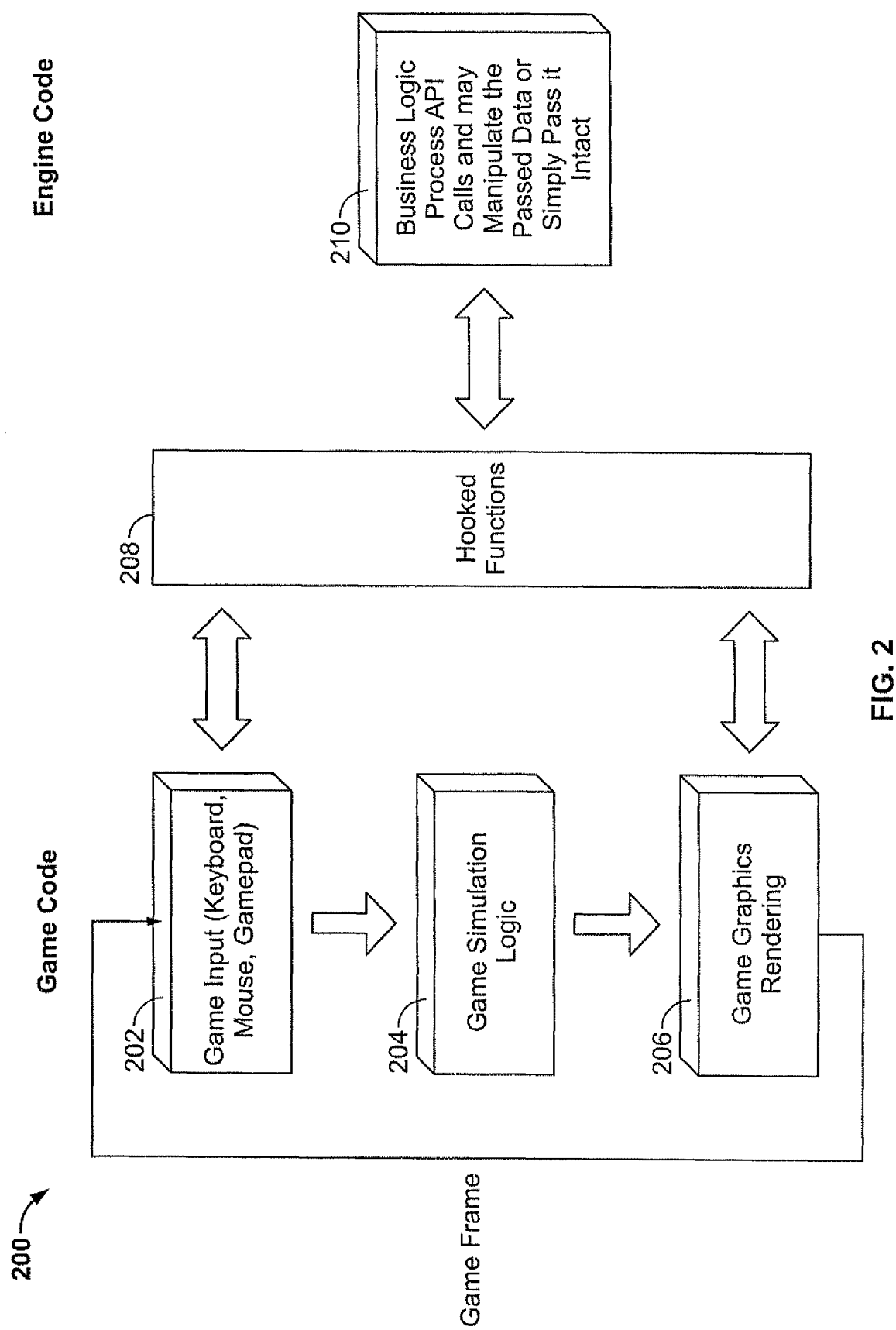
FIG. 2 is a diagram showing exemplary top-level functionality of a client-side event-monitoring alteration engine.

FIG. 2 shows an exemplary top-level functionality of a client-side event-monitoring executable or "engine." Game code performs operations indicates at the left of the figure, while the alteration engine functions are indicated at right. The game process comprises components 202, 204, 206 operating at the client node. Hooked functions 208 comprise a subset of functions belonging to the aforementioned components 202, 206, which are identified via the enabling configuration process for the alteration engine.

At component 202, user input is received by the game process from the client node. For example, keyboard input, mouse input, joystick input, or other input is received from an input device in electronic communication with the client node. Some inputs are discarded or ignored, while selected inputs cause changes in memory states via program branching responsive to the input. For example, a counter may be incremented when certain input is received, or a variable state set to a constant value. Hooked functions 203 classified as input components may be functions that increment or set machine variables, interfaces with operating system functions handling input devices, or any function causing a change in game output that is detectable by the client-side alteration engine.

Changes in memory states caused by user input, in turn, influences outcomes of game simulation components 204. Game simulation may be computationally quite complex, but generally is directed towards rapidly generating screen displays representing the current game state. Simulation generally first manipulates inputs and geometric models in a modeled environment simulating the game space. The modeled environment is then rendered at component 206 to provide a rendered frame. Conceivably, one could hook functions in the simulation component 204, as well. However, without knowledge of source code this may be relatively difficult compared with hooking input and output functions causing detectable changes in machine state.

The simulation logic, as noted, results in a rendered graphics frame as output of the frame rendering component 206. The rendered frame is output for display using the applicable graphics API for the game. These API's are often defined according to a published vendor standard, and therefore are more easily hooked. The same may be said for audio API's or outputs to the operating system. Thus, hooked functions 208 also comprise output functions of component 206. The alteration engine core 210 processes the API calls or other hooked functions. It may manipulate the passed data or pass it on intact, depending on the presently defined business logic.

The following list outlines top-level functions of the client-side alteration engine 210. All the below-listed items are explained in dedicated sections below:

Inputs to Business Logic:
1) I/O Filter;
2) Query Memory and/or Hardware; and
3) Identify and Analyze Game Objects in Memory.

Actions:
1) Overwrite memory buffer with new data; and
2) Add New Geometry.

Other Modules:
1) Business Logic;
2) Media Database;
3) Tracking Database; and
4) HTTP Interface.

Figure 3:
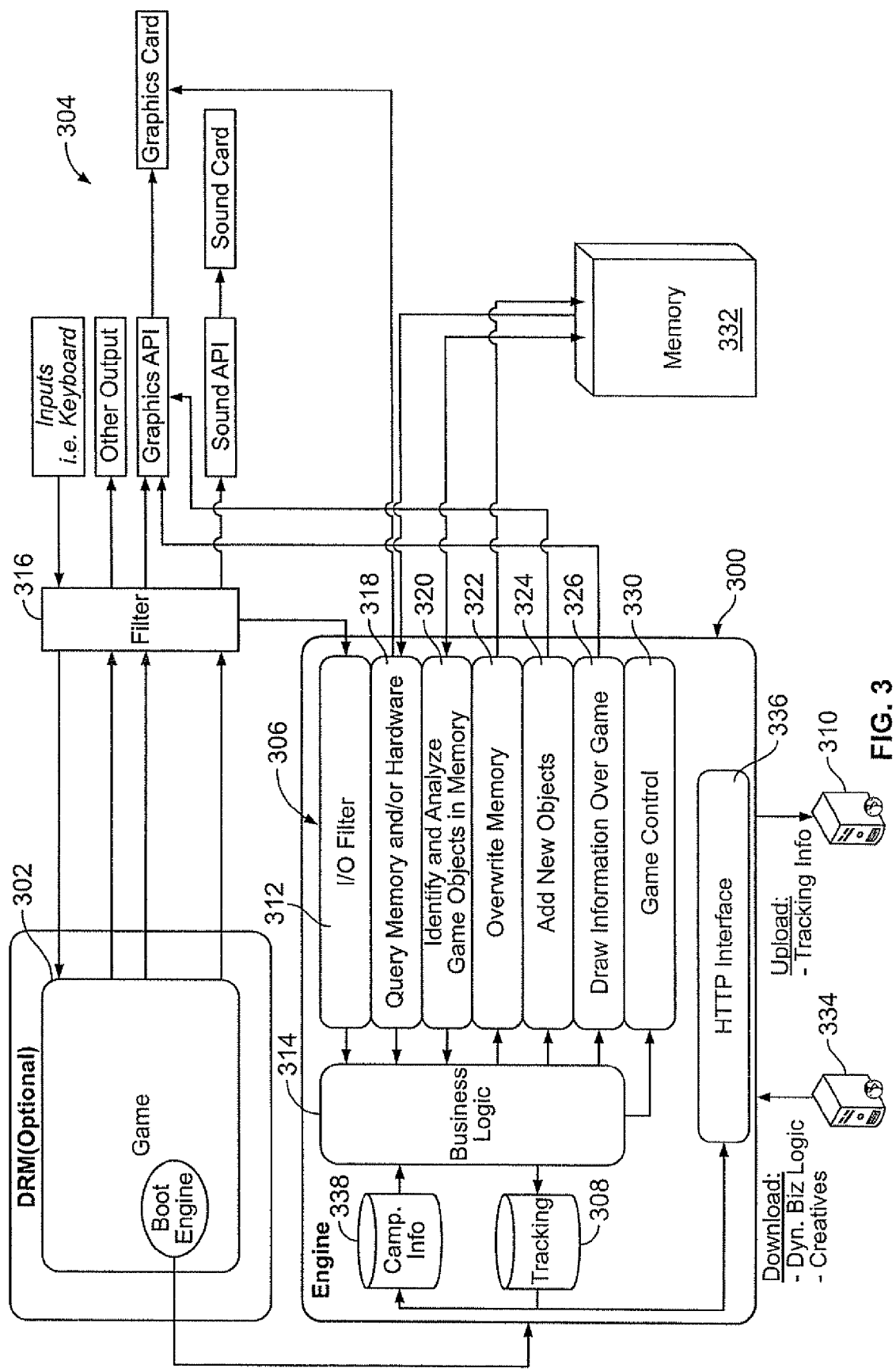
FIG. 3 is a block diagram showing exemplary components of a client-side event monitoring alteration engine and in relation to game and client components.

FIG. 3 is a block diagram showing exemplary components of a client-side event monitoring and alteration engine 300 in relation to game 302 and client components 304. The engine may be compiled from source code in any suitable languages and operate in the machine background during operation of game code, as a stand-alone application. A plurality of modules 306 function as inputs to business logic. These modules detect different types of 'events' as they occur in the game. The events serve as input to the Business Logic layer. As events occur, they are logged in a local data store 308 and uploaded to a centralized database 310 for reporting purposes.

The I/O filter 312 is configured to parse all I/O from the game and detect when those calls which were defined during the game enablement process are made by the game. Should the engine detect these reserved calls, the event is sent to the Business Logic layer 314. Examples of reserved output calls include:

1) Calls to the operating system including, but not limited to Disk I/O, network I/O timers and clocks etc;
2) Calls to the graphics API; and
3) Calls to the sound API.

Examples of reserved input calls include:
1) Keyboard/Mouse inputs;
2) Joystick or game controller;
3) Audio inputs (e.g. microphone); and
4) Visual input (e.g. from camera).

The I/O Filter module 312 may be configured to parse all of this I/O activity to detect certain defined events as illustrated by filter block 316. Any 'events' found can be used as input into dynamic business logic layer.

In addition to monitoring the user inputs and the graphics/sounds API, the alteration engine may also monitor changes to specific areas in memory. Query memory and/or hardware module 318 represents this functional module of the alteration engine. The changes in a specific memory location may indicate a change in the game logic and serve as an input to the business logic algorithm. For example, it may be determined in advance that a specific memory location holds the player's score. The module 318 may operate to monitor the memory area used to store the player's score and trigger an event when the player has reached a certain amount of points. More details regarding this action are discussed in connection with the game control module 330 discussed.

Alteration engine 300 may further perform image processing in connection with modules 312, 318 or 320 any time graphics memory is accessed to detect occurrence of a defined event. That is, engine 300 may have the capability to detect certain graphical output as an event. This can be done, for example, by sampling the image buffer for a given frame before it is rendered onscreen and checking if it is a match to a screen marked during the engine configuration process, when all business and creative decisions for a given title may be made.

It is important to note that the graphics for the entire frame are not necessarily required for image processing, but rather only the parts that uniquely describe the frame in question. For example, during level breaks many games may display a reserved screen template to inform the user of the level number, perhaps more information about the game storyline and the progress of any loading that is being performed in the background. While the level break screen between any two levels may often differ from one another, there are usually elements that remain consistent or similar in different level break displays. Image processing may be configured to select and analyze only these consistent screen regions from the graphical output during runtime to detect a level break. By only sampling a small number (for example, 3-5) of screen maps of consistent graphics regions, for which sampled regions can be much smaller (e.g., <10%) than the entire screen area, the methods and system described herein may minimize impact on system performance.

Sampling and comparison of screen graphics data should take into account changes in resolution. Since games can typically run in different screen and window resolutions, the system may compare the sampled areas by taking into account stretching and compression effects resulting from changes in the game resolution. This may be done by taking the original samples captured during the game preparation process, resizing them to the current screen resolution (using standard image processing algorithms such as bilinear filtering) that the game is running in, and comparing the currently sampled area with the original sample. The original sample is dynamically downloaded to the game at runtime along with the files that control the business logic.

Comparison between samples may be done using standard image processing algorithms. For example, each pixel in the sampled data and original sample data may be converted to 3D color space and then a color space deviation between the sampled area and the original sampled data measured. If the deviation is small enough (e.g. below a certain threshold) then the pixels may be considered as matching. If there are enough matching pixels (e.g. the number of matching pixels in the entire sampled area is above a certain configurable threshold), the sampled area may be considered a match.

The alteration engine 300 may further comprise a module 320 configured to identify and analyze game objects in memory 332. This module accesses the memory buffers for all object data and runs multiple processes on the contents, including image processing, to detect events from the information. The types of information that can be deduced by running processes on the object data include, but are not limited to those described in the numbered paragraphs below:

(1) Generating a unique ID for every object at runtime to cross-reference to a predefined list of objects that trigger events which should be sent to the business logic. The unique identifier may be calculated by applying a cyclic redundancy code or similar algorithm (such as MD5) on either part or all of the data comprising the object in memory. For example, for game textures, the algorithm may be applied on the texture image data (pixels). In the case of 3D geometry object, the algorithm may be applied on the vertex and index buffers of the object. The output from the algorithm may then be used as a key that can be used to identify objects at runtime that have been marked during configuration as markers for events.

(2) Calculating a quantitative distance between object locations in the modeled game space. For each geometry batch, the preferred calculation method is to find the location of the batch in 3D space. This may be done by either retrieving the model matrix used to position or rotate the geometry in 3D space (for example, by hooking the DirectX ID3DXEffect::SetMatrix function call) or by retrieving the information from the vertex shader used to display the geometry batch. Once the location of the desired objects in 3D space is determined, it is easy to calculate the distance between the center of the bounding boxes of each object, or other distance of interest. Distance can also be calculated between a specific object in 3D space and the current location of the camera (user viewpoint). In many games the location of the camera indicates the location of the player in the 3D environment. By knowing this estimated distance between, For example, the game's main character (which can take a number of forms based on the game story—i.e. a car, person, alien, etc) and a 'pickup' 3D object in the game (either native to the game or added by the methods and system described herein), the business logic can evaluate a number of game states. For example, such items might include:

(3) Collision detection—This allows the methods and system described herein to detect if two, or more, objects collide in the world. This information can have a number of applications. For example, if a collision between the game character and an inserted object is detected, the engine may consider the inserted object picked up or selected, and take an action based on same. For example, the engine may update the user's score or health information in memory to accrue a benefit to the user. Similarly, if a user crashes their car into a billboard, the engine may take an action visible to the game player, or simply log this interaction in reports seen by an advertiser for that billboard.

(4) Proximity detection: This allows the engine to detect when the user is 'close' to a marked object, without actually colliding. For example, if a users game avatar approaches a static billboard for an upcoming movie moves within a predefined in-game modeled distance (i.e. <5 ft within the game model), an action may be triggered. One such action may be to refresh the adjacent object with a new creative; for example, a video move trailer with its corresponding sound volume modulated as a function of the distance of the user's avatar from the billboard.

(5) Object Motion/Animation: Detect the motion or change in appearance of an object in order to decide as to its motion on screen.

(6) Calculate the viewing angle for a visible object: Once the location and bounding box of the desired object is located, it is possible to determine the viewing angle at which a user will see content located on a visible object, such as an inserted ad. To determine the viewing angle, a surface normal may be calculated from a surface representing the front of the ad. Then an angle between the normal and the vector representing the direction the camera is facing may be determined. The angle is useful to estimate a user's opportunity to see an in-game advertisement. If the angle from the camera to the display of information is highly incident, it may be hard for the user to absorb the data and therefore the advertiser may be charged a lower rate for such exposure.

(7) Occlusion check: Not all objects that are sent to the graphics API are rendered on screen. The ability to detect which objects the user has the opportunity to see is important, especially for display advertising. Such detection may be performed by occlusion culling, using graphics hardware occlusion query calls (such as DirectX IDirect3DQuery9), or other suitable method.

(8) Object Size: The size of an object on screen may be important for a variety of reasons. For example, in conjunction with display advertising, pricing models are often functions of the size of the object to the user. Similar to billboard advertising in the real world, the larger the message, the more it is worth to the advertiser and, thus, the more the owners of that space are able to charge. The present system may determine the size of an object using any suitable method, for example, by:

(a) Using occlusion queries to the graphics card to derive the exact number of pixels that a specific object occupies on the screen; and/or (b) Using the object's bounding box and transformation/rotation matrices in 3D space to project the object to 2D screen space by using the camera projection matrix, and then calculate the area the projected object occupies on the screen. It may be desirable to use both methods, depending on the game graphics API and specific game.

Either a single occurrence of one of foregoing events, or its occurrence in combination with other events may result in an appropriate action as governed by the business logic module 314. In short, the alteration engine may be configured to independently determine, according to predefined logic, when actions are appropriate by comparing the event stream captured during a game run against the action-to-event mapping defined in the dynamic business logic constructed during game preparation. In response to determining that an action is appropriate, the alteration engine may write audio, visual or character data to a predetermined memory location, causing the client to provide output from its display screen or audio output device that is altered from, or in addition to, what is output by the game engine alone. The alteration engine may overwrite data in the memory location previously written by the game engine, or may write the data in a different location to produce an additional output, for example, to play a sound clip that would not have been played by the game engine alone.

Actions: After inputs are gathered by the I/O filter 312, query memory/hardware 318 and identify object modules 320, they may be sent to the business logic layer 314 and there matched to a predefined set of rules. If an event is detected, the business logic module 314 may call one of the following modules to perform an action on the client operating the game. It is not required that an operator assign an action to an event, and thus de facto reporting-only events are also possible.

The alteration engine may also comprise an overwrite memory module 322 for using the information collected to update, supplement, change or enhance information at sites previously identified by overwriting memory. In the alternative, or in addition, the present system may also augment or insert new content in places not previously addressed. Texture and geometry objects may be replaced in the game by overwriting the buffer that stores the creative information for a given object. Since the alteration engine may intercept all graphics API calls, it may thereby determine the memory locations for the texture/geometry information written at runtime. For creative objects that are configured for replacement during the configuration step, the corresponding buffer information may be replaced before the object is rendered.

The replacement data may correspond, for example, to an advertising creative object or some community feature.

Also, game logic or "storyline" parameters may likewise be controlled or changed using the alteration engine. For example the score of the game, which is simply a value written to memory at runtime, may be increased or decreased, or an extra life or more health may be given to a player by similarly overwriting the appropriate memory location. A list of possible game parameters that may be found and altered or overwritten using this process include, for example:

1. Game score;
2. Health;
3. Power;
4. Speed;
5. Item inventory;
6. Spells;
7. Lives; or
8. Traction (for racing game).

The alteration engine 300 may further comprise a module 324 for adding new information to the primary content, as opposed to overwriting information that exists in memory. Exemplary methods for adding new objects are described below.

If required, new geometry may be added to the game by sending the appropriate calls to the graphics API. Any new geometry should be designed to fit as seamlessly as possible into the scene. Fitting of new content may be achieved through the methods associated with the game preparation tools, by finding a unique reference object and setting an offset relative to the reference object's position in the scene that makes any new geometry look appropriate (for example, in proper perspective) when displayed on the client display screen. The methods and system described herein also preferably identify unique textures so that new objects do not show up in undesired locations.

In the alternative, or in addition, module 324 may operate to animate any objects in the scene, both existing and additional objects, including objects that the game does not animate. This may be achieved through incremental changes in the vertex coordinates or by changing the transformation matrices used to position and orientate the object in 3D space. Lighting and shading can be similarly controlled through manipulating the vertex and face normals of these objects accordingly.

The alteration engine may further comprise a module for drawing graphical information over game graphics during game play. This may be used to add new objects or information to primary content of a game or other executable. Drawing information over game graphics may be achieved in much the same way new objects are added to the game, that is, through new calls made to the graphics API. However, information written over game graphics on top of game play may be controlled according to a specific rule set. For example, an event may be detected in the game (through one or a combination of inputs detected in the input modules) which triggers a commercial break video to play for 30 seconds.

A special case of drawing data over the game is the mouse texture. For games that do not use the system mouse and define a new texture for the mouse pointer in the game, the client may trap this call and ensure that the mouse pointer is always above any new information added to the game. In the preferred embodiment, this is done by detecting the mouse texture using the methods described herein and rendering all the overlays before rendering the mouse texture. In the normal case (without mouse texture detection) overlays may be rendered in the IDirect3DDevice9::Present (video buffer flipping) or other graphics API equivalent method. This ensures that the mouse pointer doesn't render underneath any additional images drawn on the screen.

Additional audio output may also be output instead of, or in addition to audio output originating from the game executable. By hooking the audio API (for example, Direct Sound) the methods and system described herein may trap the start of all sound streams originated by the game executable. The system may then choose whether to continue to play the sound stream or replace it with a different one using the method previously described. Also at any point in the game, the currently playing sound streams can be muted, by either changing their volume to 0 or stopping them all together, which may be followed up by playing another sound stream. Moreover, the system may also mix in an additional stream, for example adding a sound effect when a game avatar picks up an object.

The capability to add audio has a number of possible applications, for example: (a) playing songs that are available for sale (e.g. iTunes); (b) linking sound information to other object data, such as playing sound in conjunction with a video ad that modulates as a function of the user's distance to the video ad object; (c) changing game music on the fly based on changing market tastes, for example, playing only the Billboard Top 40 songs each week.

The alteration engine may further include a game control module 330 for controlling non-graphical responses to in-game events that alter the user's game experience, such as game pause. Non-graphical, non-audio actions include, but are not limited to: (a) minimizing the game and launching a different process such as a web browser; (b) pausing the game and displaying information to the user such as commercial break advertisement (streaming video), a community feature such as a leader board, chat room, online shop, and so forth; and (c) changing specific memory areas for scores, etc., to specific values determined by the business logic.

Pausing the game may be achieved by delaying the return from a hooked function. Graphics API's characteristically include a function that needs to be called on a frame by frame basis in order to refresh the game graphics to the graphics card. For example, the DirectX graphics API uses the Present( ) function to refresh the game graphics and update the display. This is done on a frame by frame basis. Placing a hook on the Present( ) function allows the client engine to delay the return from the Present( ) function and effectively pause the game. Most business logic code may be executed in the context of the Present function, or similar function in other graphic APIs.

The alteration engine 300 may be configured so that the business logic module 314, obtains its operating logic dynamically from a connected network host 334 when the game boots. Any media files which may be seamlessly inserted into the game at runtime may be similarly downloaded after the game boots up.

The business logic may be set globally for a particular game(s) or it can be individually targeted based on information known about a user, either from data provided by the user (e.g., registration data) or inferred from the user's HTTP header information (e.g., geo-targeting based on IP address). An example of targeting is to facilitate targeted advertisements based on geographic location, which is commonplace in online ad serving in web browsers today.

In the embodiments of the methods and system described herein, the business logic layer 314 is enabled to choose the most preferable content from among potentially competing advertisements booked in the same virtual 'inventory' location with the same set of targeting criteria. This may accomplished by one or more algorithms which take into account the time to campaign completion, the amount of inventory left to deliver, revenue maximization, response rates, or other factors, and selects an advertisement that best satisfies predetermined criteria at any given time based.

State Detection: Using the methods and system described herein, it is possible to divide a game into various 'states' based on the presence of one or a combination of detected inputs, such as, for example, textures, geometry batches, image processing output, audio data played. These inputs may support any logical combination of events in order to provide granular state definitions. For example, textures may occur many times throughout game play in many places. Such a texture, in one of its several contexts in the game, may perfectly define a location to pause the game and show a video advertisement. Due to its plurality, this texture alone may not be sufficient to uniquely describe the defined point in game play. In order to mark this region of the game, detection of this plural texture by the alteration engine may be logically combined with one or more other objector events to define a combination event, such as by using a logical "AND" statement. Further, a combination of 2 or more events should be selected to be unique throughout the game to avoid triggering a video advertisement in an undesired space. The methods and system described herein can optimally be provided with administrator tools to aid in finding unique combinations of objects.

The alteration engine may further comprise a communication control module 336 configured to control communication with backend servers 310, 334 supporting the business process. Communication is preferably bi-directional, hashed and encrypted. Any communication protocol may be supported in this manner (HTTPS, UDP, etc) and need not be limited to HTTP shown in FIG. 3.

The alteration engine may download from host 334 all business logic which governs its behavior. The engine 300 may download this information to the client node at any time, for example, beginning during game boot. Therefore, business logic used by the alteration engine may be changed after initial configuration and installation on a particular client. The alteration engine may also obtain the location of any files it may require for proper functionality, for example, videos, internet web addresses to 3rd party ad servers, static creatives, and other content.

As the game is played, there are various events and in-game actions that may trigger tracking events to be subsequently logged locally to a tracking database 308, which may reside in short-term memory or on disk. The business logic module may be configured to log all detected events and any media usage in the local database 308 that is periodically uploaded to one or more host locations. These are used for billing and tracking purposes and employ standard encryption methodologies, and in other manners understood by one of skill in the art Tracking logs may be periodically uploaded to a server 310, in either raw or summarized form, for reporting purposes (e.g. billing). Server 310 may receive and aggregate tracking information received from multiple clients.

The alteration engine may further comprises a local campaign information database 338 for mapping of new, dynamic media files and the metadata which governs how these media files are to be used in the game context. For example, the system may download a texture file "green.jpg," with instructions to use texture file on a defined object (e.g., on "object id 123") for clients in a defined location and/or time. For example, use of the texture may be limited to clients having IP addresses characteristic for California clients, and only during prime time hours.

Figure 4:
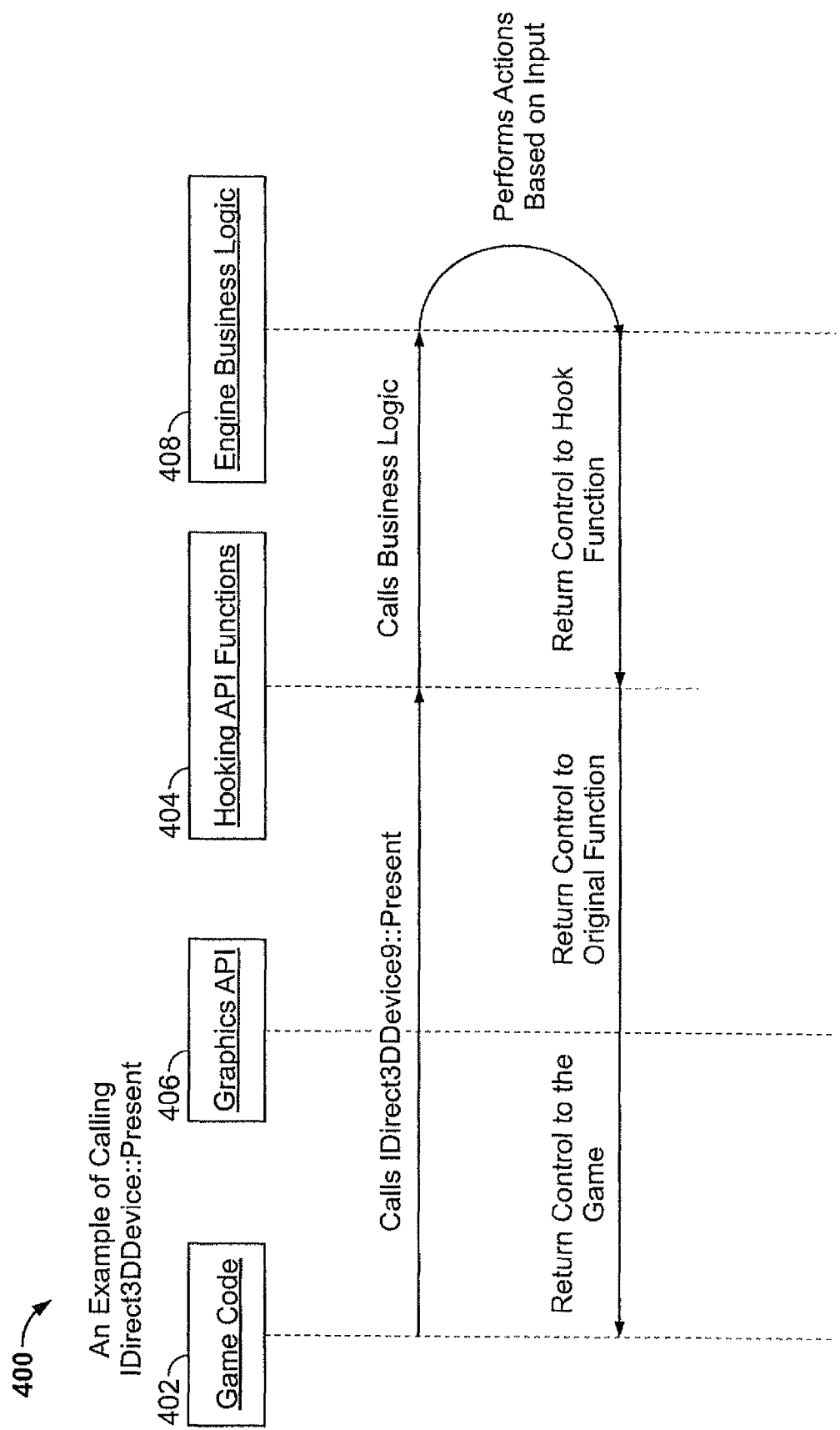
FIG. 4 is a diagram showing a hooked function call life line.

In general, it should be apparent that I/O calls may originate from various different sources. FIG. 4 shows an exemplary hooked function call life line 400 such as may be used to hook and return call to graphics API, generally in accord with the architecture shown in FIG. 3. The illustrated example is based on the DirectX™ Present( ) function call, which presents the display with the contents of the next buffer in the sequence of back buffers owned by the device. The game executable 402 issues a present(x) function call, which is detected by an I/O filter via operation of a hooking API function 404. The hooking API function receives the call as a surrogate for the graphics API 406 for which it is originally intended. The hooking API function calls the business logic layer 408, which may determine what, if any, actions to perform based on the contents of the call and the predefined business logic. Any designated actions are performed and control is passed back to the hooking API function 404. An action might include altering the contents of the call via a memory overwrite action. The hooking API function 404 passes control back to the graphic API 406, which processes the call normally. Control is thereby returned to the game executable 402.

Figure 5B:
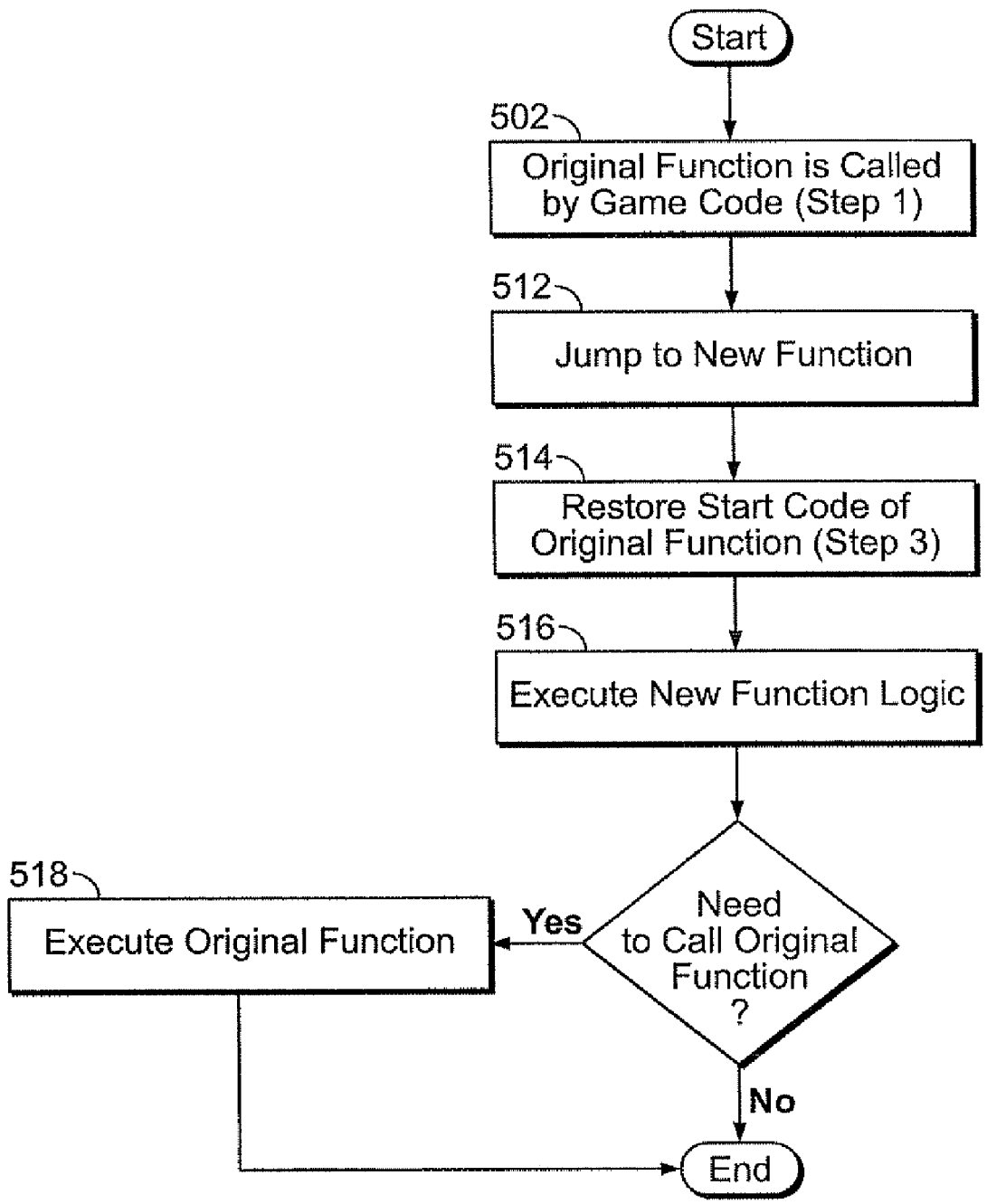

Further details are provided in FIG. 5A, which is a flow chart showing exemplary steps performed by a hooking method 500. The first step 502 is initiated when the game calls a hooked API function, having a memory address 504 pointing to a code location where the first bytes 506 of the original function 508 are stored. When this call is detected, the alteration system selects a function pointer 510 for substitution with the first bytes 506. Selection of the function pointer 510 is controlled by the events-to-action mapping performed by a business logic module of the alteration engine, as described above. Detection of the original call may be a triggering event, or some other events may have also occurred making up a combination event. It should be apparent that the specific addresses shown in FIG. 5A are merely exemplary, and any memory addresses may be detected or used.

At a second step 512, the first bytes 506 in the original function are changed to jump to the address 510 of the new function, which will alter the game functionality. The information that is replaced 506 is stored in a temporary space. Thus, when the function is executed, it jumps to a location of a replacement function. What happens next depends on whether or not it is desired or necessary to run the original function code 508 after the replacement function is finished executing. If it is not necessary or desired to run the original function, the replacement function will simply be executed until completion without calling the original function. If it is desired to run the original function after the replacement function, the replacement function will call to the original function after the replacement function is finished.

In the second case, therefore, after the call to the replacement (new) function is completed, the first bytes 506 of the original function 508 are restored, as shown at step 514. The steps discussed above are diagramed more compactly in FIG. 5B. Of course, the complete the replacement action the new function logic is executed at step 516. Optionally, if specified by the business logic, the original function may then be executed as shown at step 518.

Some Business Applications of the Technology

This present technology solves many issues faced in today's gaming market and provides for new opportunities. Online game publishing is often marked by fierce competition. Not only do many games have mechanics and stories that very closely resemble one another, but even a publisher (or similar other aggregator like a portal) may have exactly the same games to offer their users as their competitors. Therefore, publishers may be motivated to find alternative methods to monetize game play. These alternative methods may be products and services to upsell the gamer (i.e. in-game items sales) or that are not funded by the user (i.e. advertising).

The present technology enables such alternative monetization methods, surprisingly without the need to involve the game developer. This opens up content to value-add community features and alternative monetization options that may have otherwise been closed. This is the certainly the case with back catalogue games, where access to the developer may be impossible, and also more generally.

Using the present technology, placement and definition of advertising, sponsorship or community functionality may be changed at any time and for any game according to any business needs of the moment, even after it has been downloaded and played by the end user. This enables many desirable results, for example, definition and deployment of advertising in real-time for games that are already downloaded to users' machines. Such changes may be implemented by dynamically changing campaign information downloaded from the server at game boot that controls the behavior of the engine through the business logic module. Changes or different campaigns may be implemented as often as desired, as business needs arise. This capability enables an organization using this technology to make the business decision of which advertising features to deploy in a particular game according to gamers tastes and advertiser's demands on that day. This is an enormous advantage over defining these features during game development, which could be months, or even a year, in advance of demand. Needless to say, it is very difficult to make the best business decisions that far in advance.

In addition, the present technology may save money and time over prior methodologies, which require complex, code-level integrations. This means that the publisher requires that the game developer implement these features in a game. It has proven to be complex and costly for publishers to educate programmers in project requirement, manage code development projects and perform quality assurance on developed code, especially when code development is outsourced to less expensive overseas locales where communication barriers may be high. Allowing enablement of these features without requiring developer involvement, therefore, not only allows the flexibility to optimize these features for their games in market to make them as fun as possible for the gamer or as valuable as possible to advertisers, and may also save significant time and money.

Another advantage of the present technology is the ability to customize business logic by any number of data points known about a particular user. Similar to the way that banner ads are targeted on the Internet today (via geography, day, time, etc), so can the business logic be changed after game release depending on the context of the user. This may help make the content of a game as relevant as possible for a given user, even providing the capability for a configuration that is optimized down to the individual user level by simply altering the files that house the business logic which are downloaded by the user when the game is played. For example, a game played in France may have an Achievement called "50 k points" sponsored by Peugeot whereas in the United States, perhaps where gamers are routinely able to score higher, the achievement bar may be set higher to be "100 k points". This U.S. focused achievement may be sponsored by a different advertiser, or the same advertiser, as in France.

The present technology also enables ad-hoc definitions for community building features. Online game publishers often find user acquisition and retention to be challenging. Compounding this is that the same games may often be distributed through various channels, including various online and offline options. The technology described in this document provides publishers and others the ability to add features to released games at any time, to differentiate their offering from among their online and offline competition and more efficiently optimize investment in a title.

Some illustrative examples of functionality provided by the present technology may be helpful. Publishers may, for example, optimize the achievements offered to their users to make their games more fun to users. Such achievement may comprise a variety of things within the game context, such as (a) reaching a certain level by hooking the call to the OS to load the data that corresponds to any given level; (b) finding a certain unlockable "Easter Egg" by either tracking a unique texture that displays only when the Easter Egg is found or having the engine add the entire object on its own; (c) achieving a scoring tier by finding the location in memory that corresponds to the score and monitoring its numeric value; or (d) adding additional features like ad hoc tournaments or game-in-a-game functionality, which may also be sponsored by advertisers to add another, more direct, form of monetization.

The technology proposed herein affords the publisher a two step process:

1) Enabling a game with the client engine files and allow for the launching of same by altering the original game executable before market distribution.

2) According to business needs (receipt of an advertising insertion order, desire to add an achievement, etc) a non-engineer operator may define the exact features they care to add to a given title using rule-based tools. These tools allow the user to define different features per geography, day of week, time of day, or any other information that may be known about a given user, as needed but not required. Once these rules are defined, a downloadable database that houses the business logic and the locations of any creative files is prepared and deployed to the appropriate clients according to any targeting that may have been assigned.

The client engine, once in market, may report back to a central server farm with basic information regarding game play, which allows the Publisher to understand how their games are being used in terms of number of unique users, number of game sessions and total game play time. Using the present technology, it is possible to have a central database of all achievements that certain user may have accrued across a network of games enabled with this technology. Each achievement may be stored in such a way to allow for users to view what achievements others in the community have achieved and/or garner some form of credit for getting these reserved achievements. These points can be used simply for bragging rights or could also be used as some form of loyalty program where they have some intrinsic value. Further opportunities include creating ad hoc, dynamic tournaments around existing game play mechanics like getting the highest score or beating a level in the shortest period of time. These tournaments may also be sponsored. Also, having the ability to add 3D objects anywhere in game play allows the engine to embed dynamic items for the purposes of creating a scavenger hunt functionality. Once found, users can receive rewards via these items or win more usage points. In general, the present technology opens a rich array of possibilities for transforming the marketing, publication, and use of computer games.

Run Time Integration (RTI) Tool

A run time integration tool may be provided to enable a less skilled operator to quickly and easily to implement ad objects such as videos or overlays in an alteration scheme designed for use with a particular game, without the need to for access to the game's source code. The integration tool may perform all steps needed to configure an alteration engine and package it for installation at a client computer. The tool may also assist the operator with configuring updates to business logic files. This section describes exemplary operation of a suitable tool.

Figure 6A:
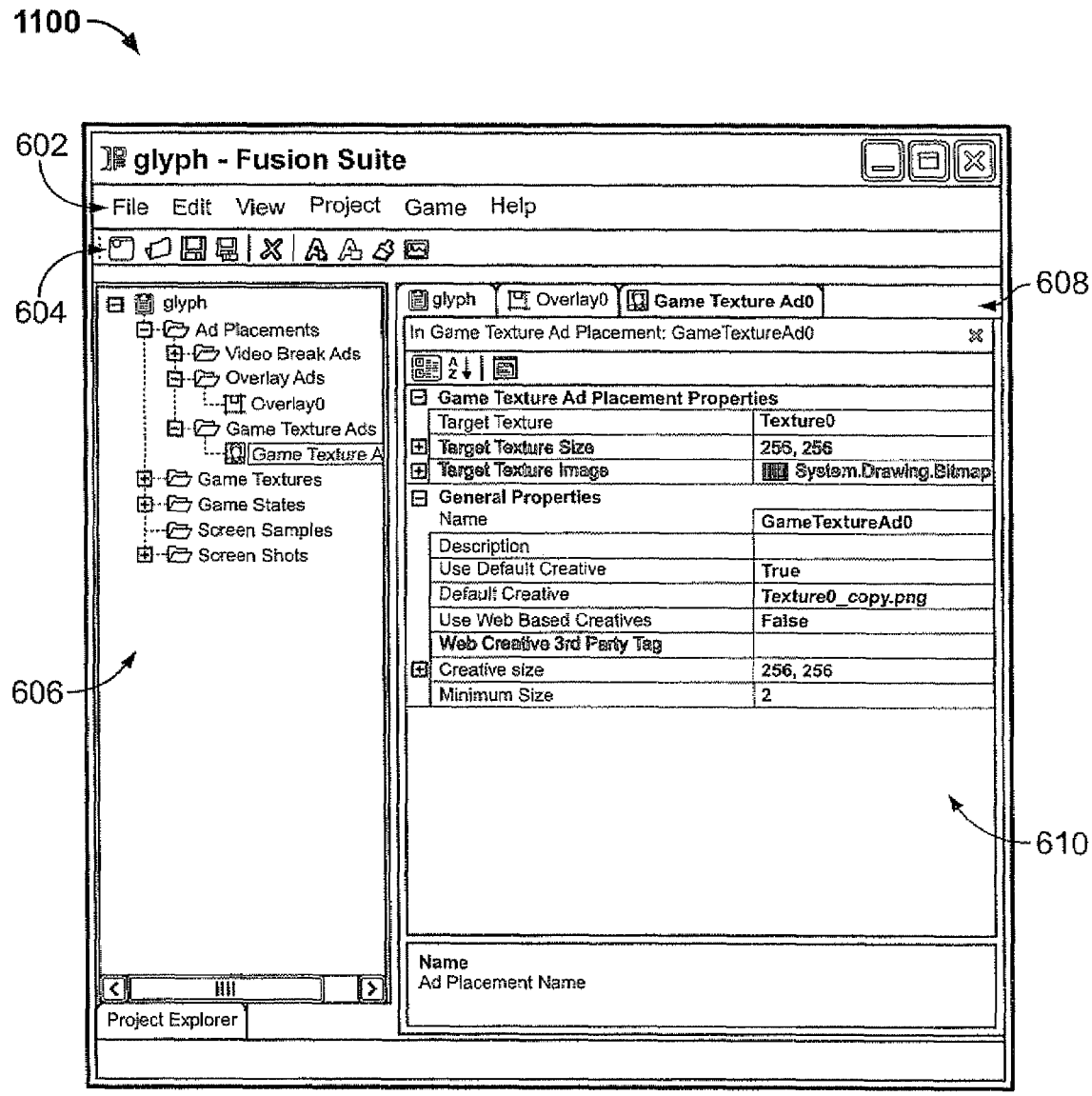
FIGS. 6A-18B are exemplary screenshots such as may be generated by a runtime integration tool for configuring an alteration engine to operate with a game executable.
Figure 6B:
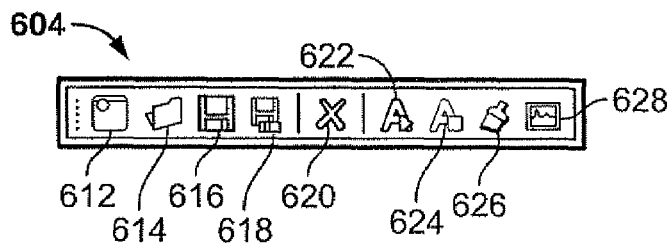

FIG. 6A shows an exemplary screenshot of an introductory (i.e., home) window 600 for a run time integration tool. The window provides a menu bar 602, a toolbar 604, a project explorer 606, a tab bar 608 and a main panel 610. FIG. 6B shows an detail view of the exemplary toolbar 604. The toolbar includes the following exemplary icons:

A. New Project 612—Creates a new project.
B. Open Project 614—Opens an existing project.
C. Save Project.616—Saves the project.
D. Save Project as . . . 618—Saves the project under a new name.
E. Delete 620—Deletes the project.
F. Launch 622—Launches game using the selected launch mode.
G. Stop game 624—Stop the game play.
H. Clean game 626—Return game to clean original uninjected status
I. Open texture controller 628.

Figure 7:
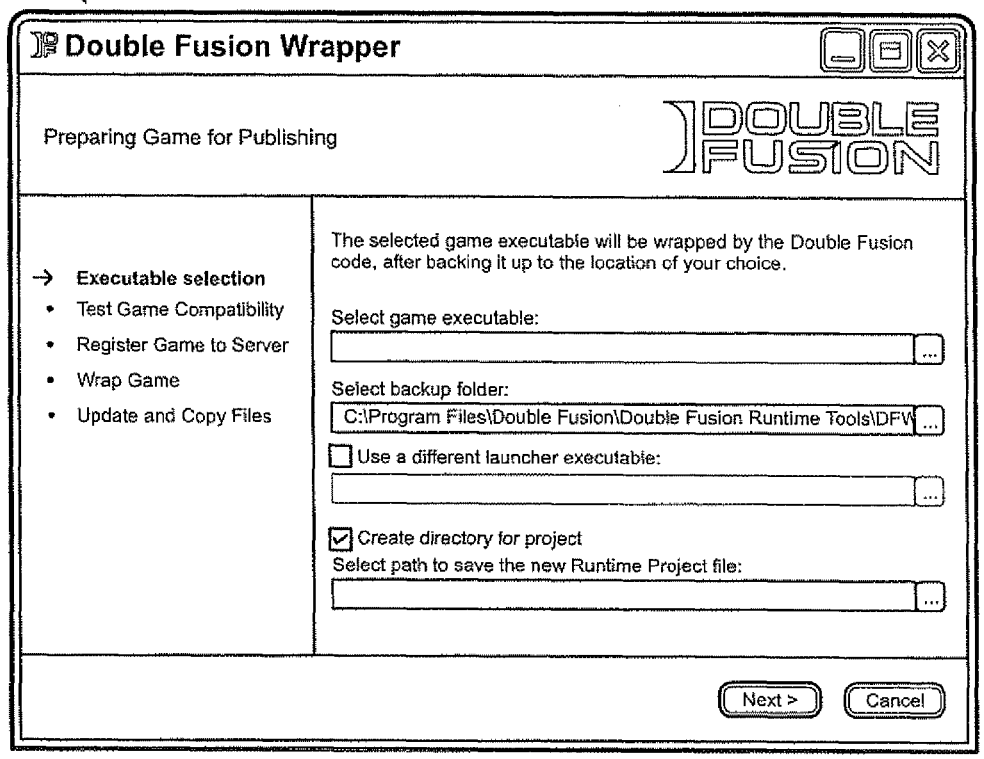

FIG. 7 shows an exemplary window 700 displayed by the tool for compliance testing and registering the game with host servers that distribute business logic or receive tracking information from client nodes. This window may be provided in response to opening a new project using the new project icon 612 or by requesting the window using the menu bar 602. Selection of the "Next" button on this screen may result in display of window 800 shown in FIG. 8.

The purpose of screen 700 is to enable selection of the executable game file to be intercepted and controlled by a launcher program to integrate the alteration engine with installed game code. Most games have only one executable file which loads the game. However, some games may have two executables, with the first executable having the purpose of calling a real executable, which will load the game. Screen allows selection of the appropriate executable in either case. After selecting the game executable, the operator selects the path where the runtime project file should be saved and selects "Next."

Figure 8:
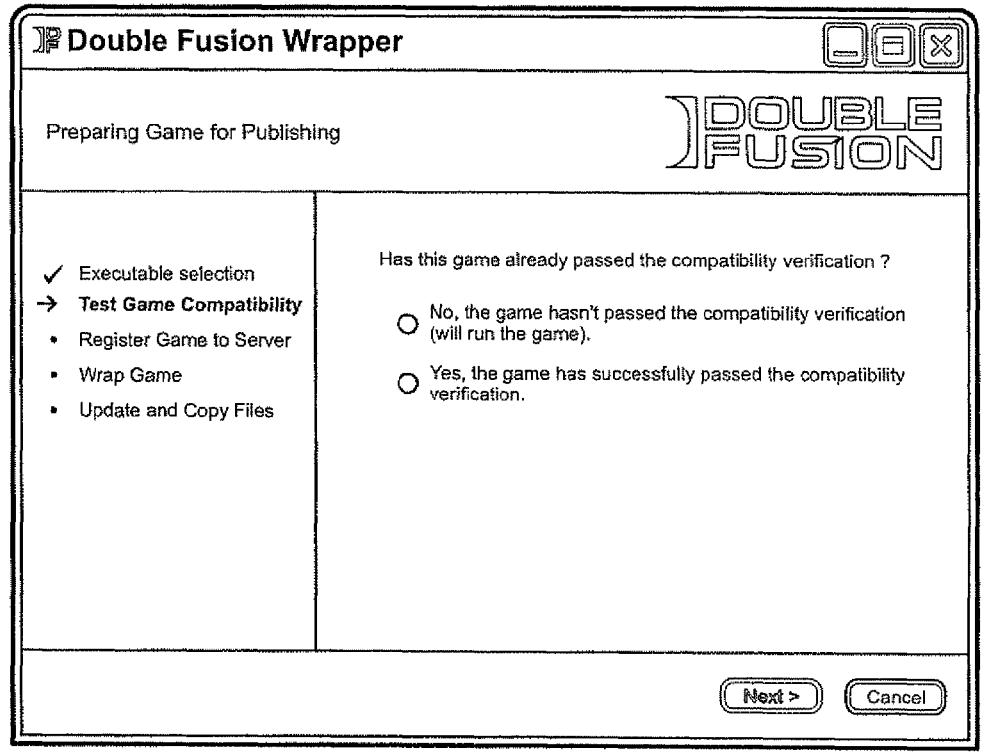

FIG. 8 shows an exemplary screenshot of a window 800 configured for a compliance test. This step is unnecessary if the selected game executable is known to be compatible with the integration tool. Various implementations of the present technology may not operate properly with all games, so this screen provides the operator the ability to determine whether a selected game is compatible with the technology implementation. To begin the compliance test the operator chooses the first option and clicks "Next". The integration tool will launch the game and display a test video ad and an animated overlay. If the ads are displayed correctly it is safe to assume that the game is compatible with the technology. If the ads are distorted, or do not show at all then the game is not compatible. There may be several reasons why a game fails a compliance test. For example, the game executable may be encrypted or otherwise protected, or already integrated with an alteration engine. This will probably result in a quick termination of the compliance test. Another common error may arise from selecting the wrong executable, in which case the game will run correctly during compliance test without displaying any of the additional inserted content. Some API's may not be compatible, for example, some Directx versions will not pass compliance testing in the current implementation. Once the game has passed compatibility testing, the operator indicates this by selecting the option and is ready to register the game.

Figure 9:
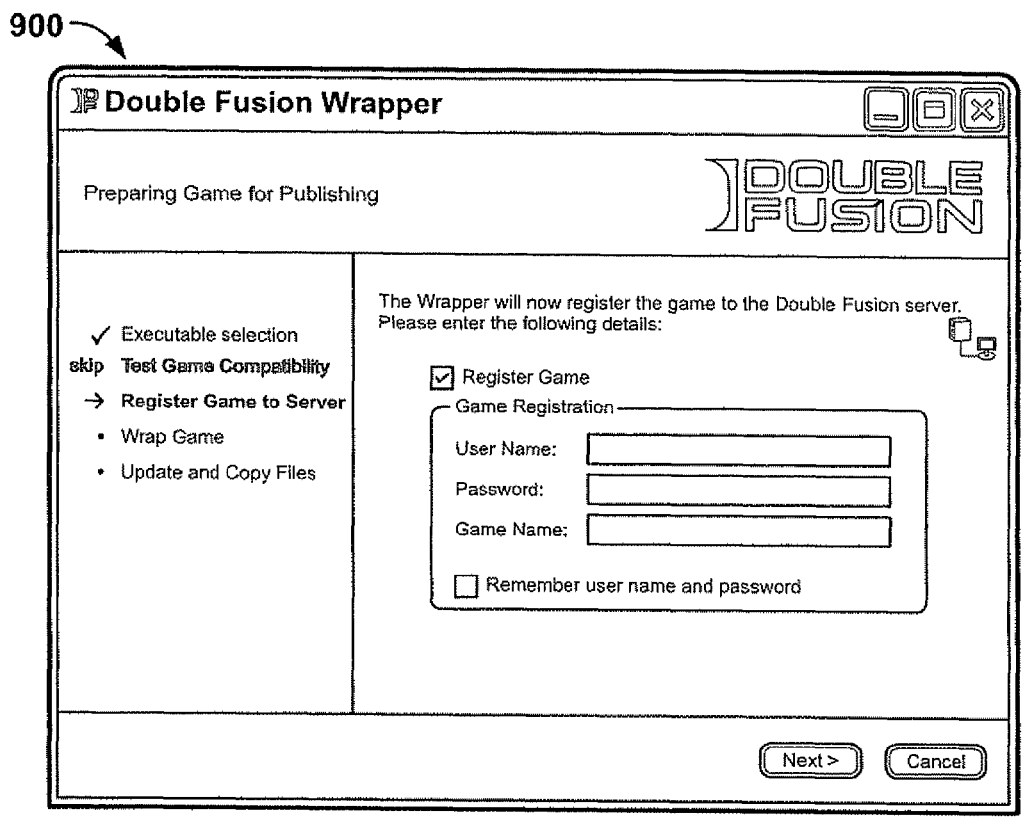

FIG. 9 shows an exemplary screen shot for a registration screen 900 of the integration tool. Registration may be made optional to enable operators to test the integration tool before deciding whether to release the game as ready for the alteration engine. In that case the "Register Game" check box may be unchecked and the operator may click "Next." If the game is to be registered, the operator supplies a user name and password, which may be determined by the host operator. In addition, the operator supplies a unique game name at this screen. Clicking "Next" causes the tool to communicate this information to the host server, which registers the game in its database.

Figure 10:
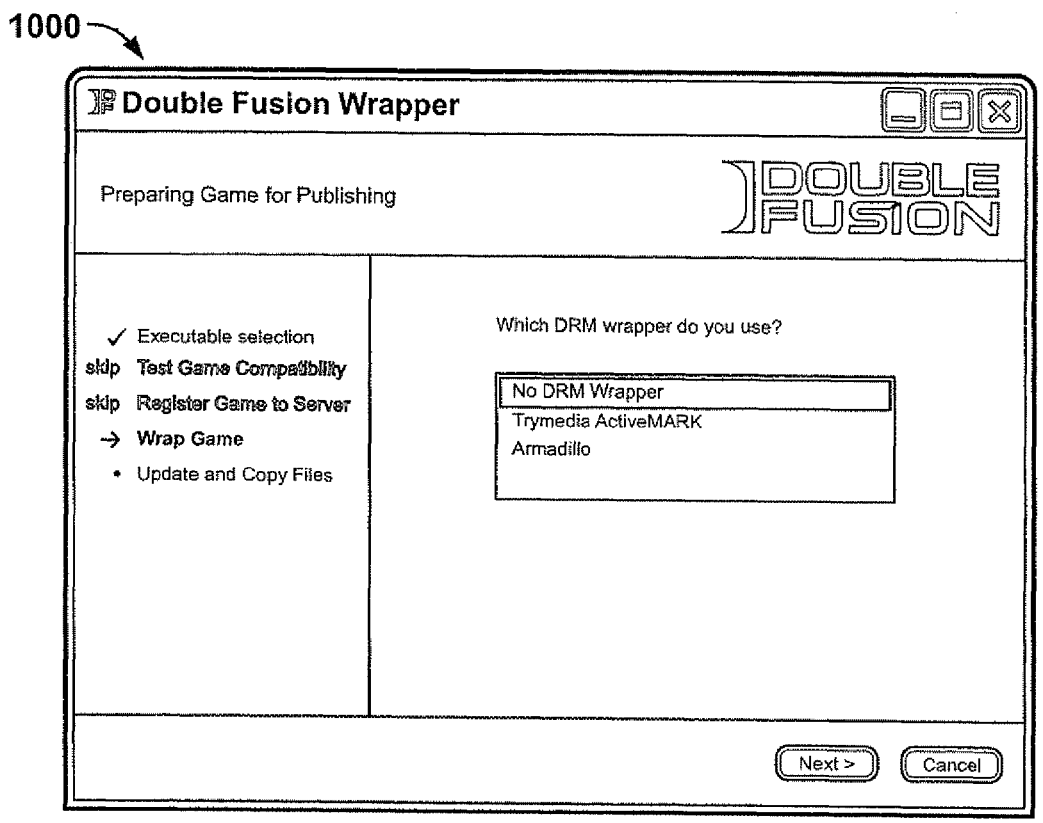

The next step is to inform the integration process of the type of digital rights management (DRM) protection that the game will use. This may be done using a selection screen 1000, as shown in FIG. 10. Screen 100 shows choices for various different DRM schemes or no DRM. The operator may select an appropriate choice and click "Next" when the choice is complete. The project is then initiated and the operator may proceed to configure it as desired. Various configuration choices are illustrated in the following description.

Figure 11:
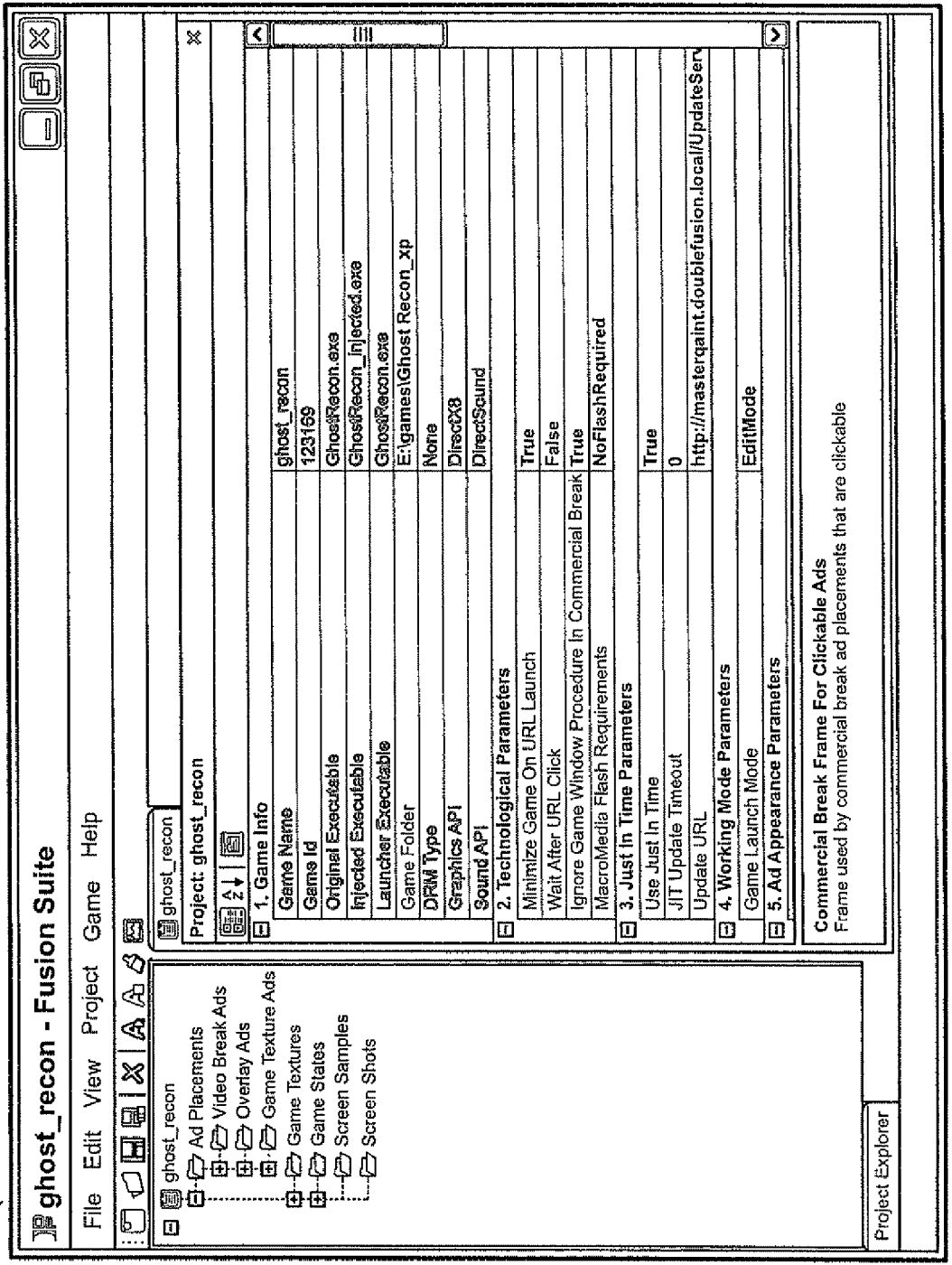

FIG. 11 shows a screenshot of an exemplary window 1100 containing general game information, which came from the project creation procedure. Most of the fields in this section can't be changed from this screen. These fields may include: game name (entered by the operator when registering the game); game ID (received from the server during the registration process); the game executable file name; game folder (the folder containing the game files—which can be changed by the operator); DRM Type (selected earlier in during the process); graphics API (the type of graphics API the game uses); sound API (the type of sound API the game uses).

Screen 1100 may also be used mainly setting various technological parameters needed for some games to run correctly. One parameter is whether or not to minimize game on URL launch. If "True" this will minimize the game when clicking on a creative, which has a URL attached to it. Some games may crash if the game window isn't minimized when a URL is clicked and require this option to be "True". Another parameter may be whether or not to wait after URL click. Some games continue to run when their window is minimized. This option prevents them from continued running when the player has clicked on a creative. Another parameter may be whether or not to ignore game windows procedure in commercial break. Some games may crash when the game window is minimized by either clicking ALT+TAB or clicking on a video creative. If this option's value is "True" then these games will not crash. However, when playing a game in a full screen mode and pressing ALT+TAB while this option is used, the game window will not be minimized to the desktop. Therefore it may be recommended to use this option only in games that crash when their window is minimized. Another parameter is to define macromedia Flash requirements. Some players may have an older version of Flash Player, which could cause the game to crash or freeze during the playing of commercial video. In order to prevent this problem the operator may define the minimum version of Flash player the client must have in order to display video ads. For example, if the player has an older version then the video commercials will not be displayed.

Screen 1100 may also be used to set just-in-time parameters, which means the use of downloadable configuration files to change the business rules operating the alteration engine on the client. Selecting "Use Just in Time" enables use of JIT option. Selecting "JIT Update Timeout" allows the operator to define how much idle time will pass before the client will abandon its connection to the server during the JIT process when checking the server in order to determine whether there is a new version of the business logic files.

Screen 1100 may also be used to set working mode parameters, which define the way the game will run. For example, edit mode will run the game with a profiling enabled library. This mode may be used to define and implement the creative strategy as it enables many functions such as skipping video commercials which are disabled in the runtime mode. Release mode will run the game using the normal library. This mode may be used to see how the ad object will appear and behave, when the game is released to the public. Original mode will run the game without the alteration engine. It's recommended to use this mode for debugging, to see if the alteration engine is responsible for an error or if it occurs in the original game as well. Force window mode will force the game to run in window mode even if such option isn't available in the game's runtime options. This option is particularly useful during the texture capture process to display both the game window and the textures controller tool.

Figure 12:
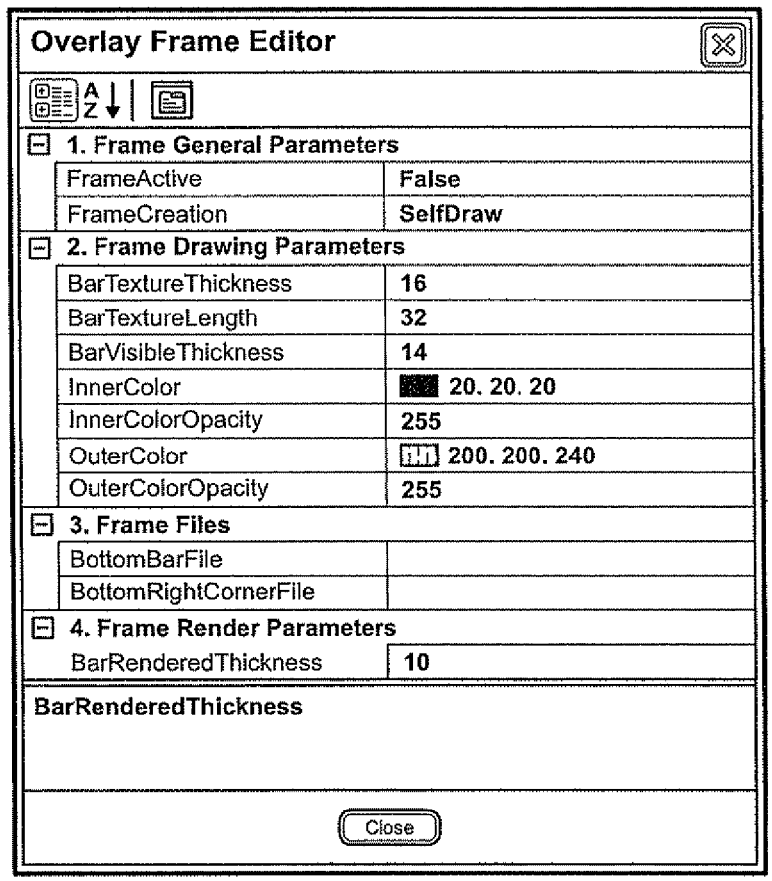

Screen 1100 may also be used to set ad appearance parameters controlling the look of different ad objects. Overlay frame may be used to define a frame for the overlay ad objects, with a default being "no frame". Various other display parameters may set to control appearance of the frame for ads or videos. FIG. 12 shows an exemplary screen 1200 for setting frame parameters.

Figure 13:
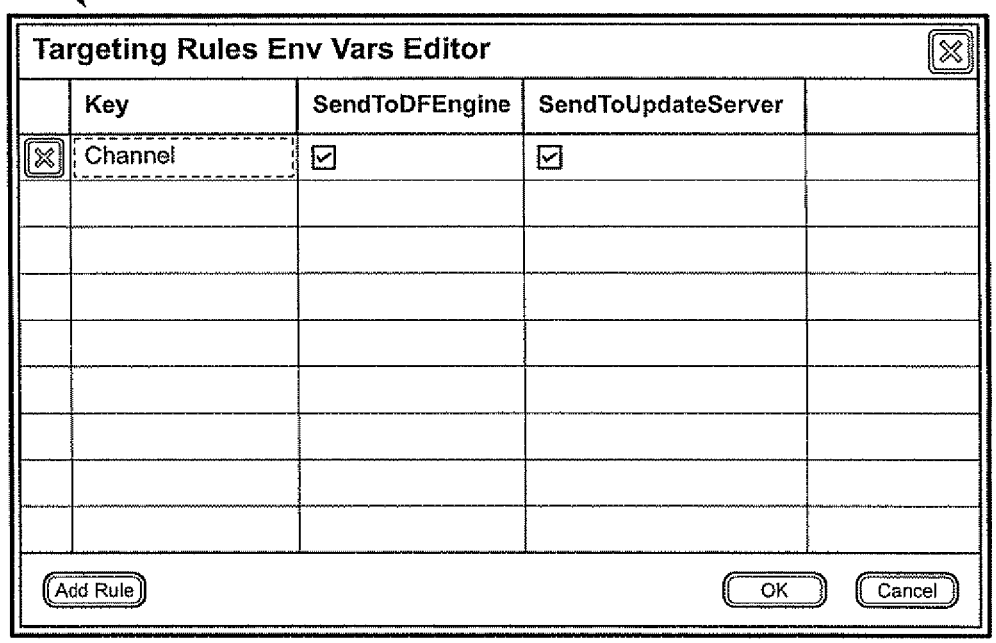

Some games will be distributed through different channels and the RTI tool enables the operator to define a different campaign for each channel. FIG. 13 shows an exemplary window 1300 to define these channels. The Armadillo wrapper changes an environment variable in order to define the game's channel. This property allows the operator to define this channel for the RTI engine. The "Add Rule" button may be selected to write the name of the channel and choose whether this key will be sent to the RTI engine, which will use the value from this channel in order to determine whether to show commercials or not and/or to the server in charge of updating the different business logic files. Targeting rules may be used to define different game channels, which will be hard coded into the alteration engine files.

Different parameters may be used to manage the communication between the RTI client and the client update server. The Master Server URL identifies the server from which the client downloads all the needed information, such as creatives or newer versions of the business logic files. A Campaign Update Interval parameter enables the operator to define the interval (in minutes) the RTI client calls the server. The default value is −1, which means that the RTI client will contact the server once in a game session. Ad Impression Save Interval allows the operator to define the number of minutes passed before saving the tracking data to the players hard drive. Ad Impressions Reporting Interval allows the operator to define the number of minutes passed before sending the tracking data to the server. Shutdown Network Timeout allows the operator to define the number of minutes passed, without being able to connect to the server, before terminating the connection tries.

The tool also may enable the operator to define keys for different actions. The operator may then define a combination of keys, for example, Shift+W, which will trigger an action.

Mouse position detection parameters enable the operator to detect the mouse position on the screen. This is useful when the operator want to use the "mouse over" option, such as highlighting an overlay when the cursor is over it. The "X-Offset" and "Y-Offset" parameters are used to determine the position of the cursor in the game and make sure it is part of the cursor texture. The "Invert Y-Axis" is used if the game cursor is inverted for the real cursor. The operator may use this to make sure the mouse and cursor move together.

The RTI tool may enable the process of defining the different game states triggering events. A state may be a set of in-game points (screens, game levels etc.), which share the same creative strategy. To simplify this, each project may be initially provided with pre-defined states, such as:

GameBegin—A state which becomes active when the first frame of the game is rendered by the game engine. This state is mostly used for displaying pre-game commercial breaks.

GameEnd—A state which becomes active when the player leaves the game. It's used for displaying post roll commercial breaks.

Idle—This is the default state, which will be active when other states are inactive. This state is useful if the operator wants a commercial to constantly appear during the game.

The operator can define "Tailor Made" states by either using Texture Detection or Sample Detection.

Figure 14:
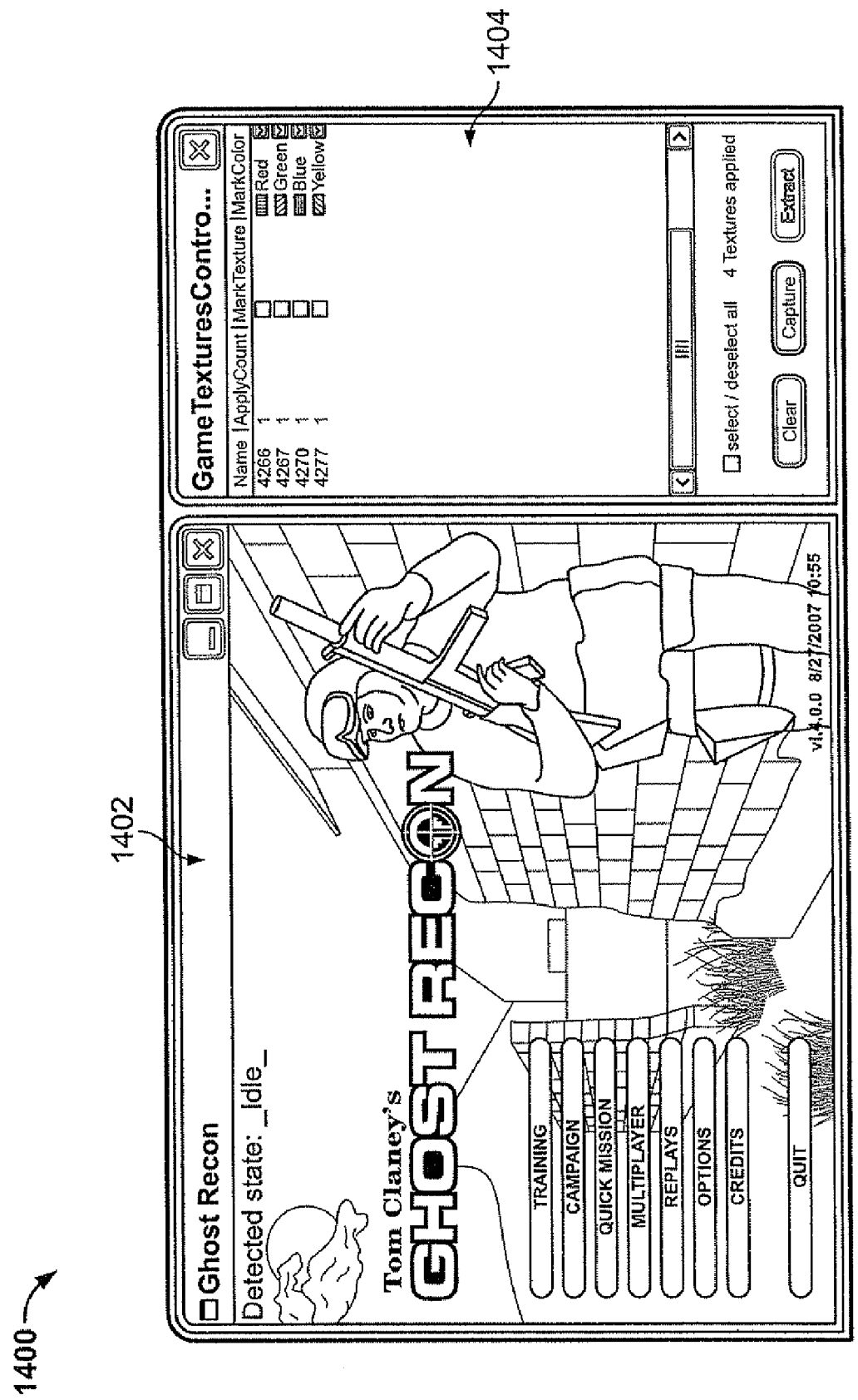

The main tool for texture detection and extraction is the texture controller. The operator may run the game in a state which allows the operator to see both the game's window and the texture controller window. The operator may do this by either running the game in a window mode or using two monitors, one showing the game and the other the texture controller window. FIG. 14 shows an exemplary screenshot 1400 including a game window 1402 and a texture controller window 1404.

Then, by further game play the operator may reach a screen where he would like to implement an ad object. At this point, the operator may press the "Capture" button and the Game Texture Controller will capture all the available textures in the screen. As shown in FIG. 14, in this example the Game Texture Controller found 4 different textures in this screen. After detecting the textures, the operator may select the textures that will be used for defining a state. The Game Texture Controller helps the operator to see which role each texture plays in the screen, by clicking on the "Mark Texture" checkbox of the desired texture. For example, if texture number 3 is marked the RTI engine may paint all the text in the main menu in blue, which is the color the game texture controller assigned to this texture. After deciding which textures to use in order to define a state, the operator may simply left click on the texture and click on the "Extract" button.

Figure 15:
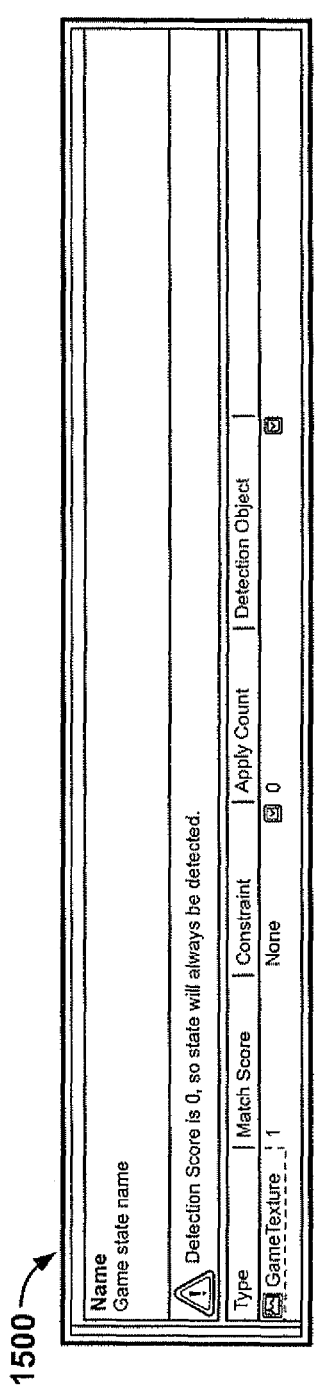

After extracting all the needed textures the operator may define a new state. An operator may initiate this process by right clicking on the "Game States" folder in the project explorer and clicking on the "New Game State". FIG. 15 shows a portion of an exemplary window 1500 that may then appear. The operator may change the state's default name to something meaningful. For example, if the operator wants to define a state which will appear only in the main menu, it may be named "Main Menu". This window shows two important fields: detection score & max detection count, which will be explained below.

After the state is defined, the operator may define the state detection rules. The operator may right click on the state in the project explorer and choose New Detection Rule to bring up a window for defining these rules. The operator may choose the texture he wishes to use for the detection rule using the "Detection Object" combo box. After this, the operator may define: (a) Match Score, which is the amount added to the score by the specific detection rule, and when the score is reached the state is active; (b) Constraint, which is what must be met in order for Match Score of a specific detection rule to be added to the overall Detection Score of the game state; (c) Exactly, which is the number of existing instances of a texture must exactly match what was defined in the Apply Count; (d)

Any, which means that as long as at least one instance of the texture exists the constraint has been met; (e) None, which means the constraint is met only while the texture does not exist; and (f) Apply Count, the number of times the texture is used in the screen, from which it was extracted.

The more rules the operator adds, the more precise will the state detection will be. After finishing defining the texture detection rules the operator may update Detection Score & Max detection count fields. Each detection rule has a Match Score. When a detection score is reached the state may be deemed detected. For example, if the operator has four texture detection rules, each one's Match Score equals 1 and the operator set the Detection Score value to 4, this means that the state will be deemed detected only if all the rules were matched. For further example, if the operator has defined four texture detection rules each one's Match Score equals 1 and the operator set the Detection Score value to 3 this means that the state will be deemed detected if at least 3 rules were matched.

The Max Detection Count property may define how many times a detected state will appear. The default values is "Unlimited", which means that a state will always appear, provided enough state texture detection rules were matched. However, sometimes the operator may prefer the state to appear only a limited number of times. For example, if the operator would like to create a pre-game video, which will appear only once in the main menu screen, the operator may create a state whose Max Detection Count is 1.

Figure 16:
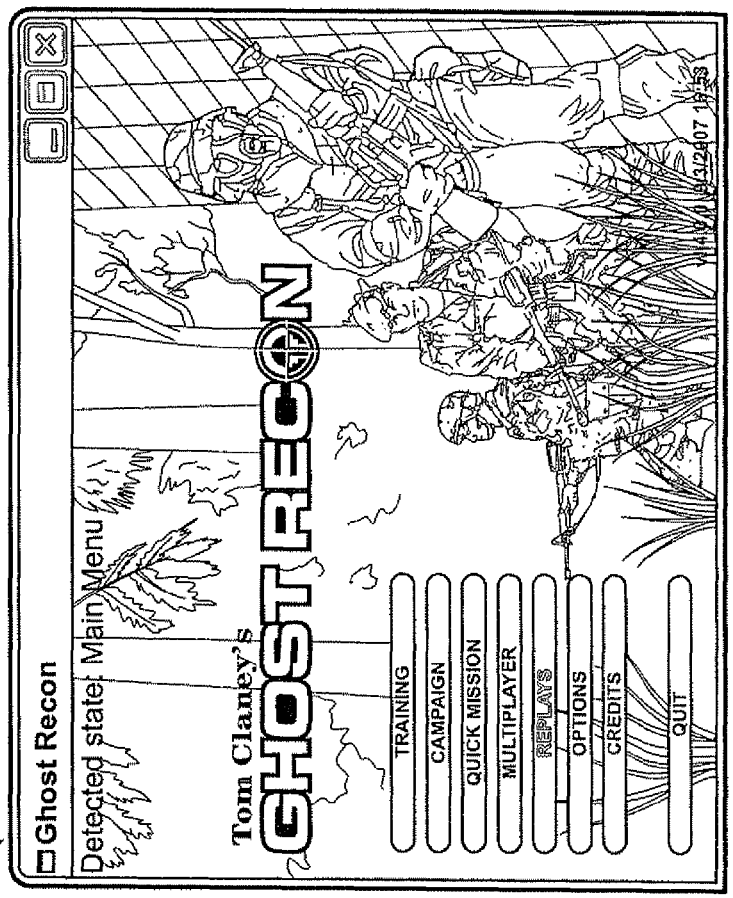

After the operator has defined a state the game may be tested to see if the state will be detected correctly. The operator may launch the game from the RTI tool and go to the screen(s) where the state should be active. If the state is active then in the upper level of the screen a caption "Detected state:<The state's name>" may appear. An example is shown in FIG. 16, screen 1600.

Figure 17A:
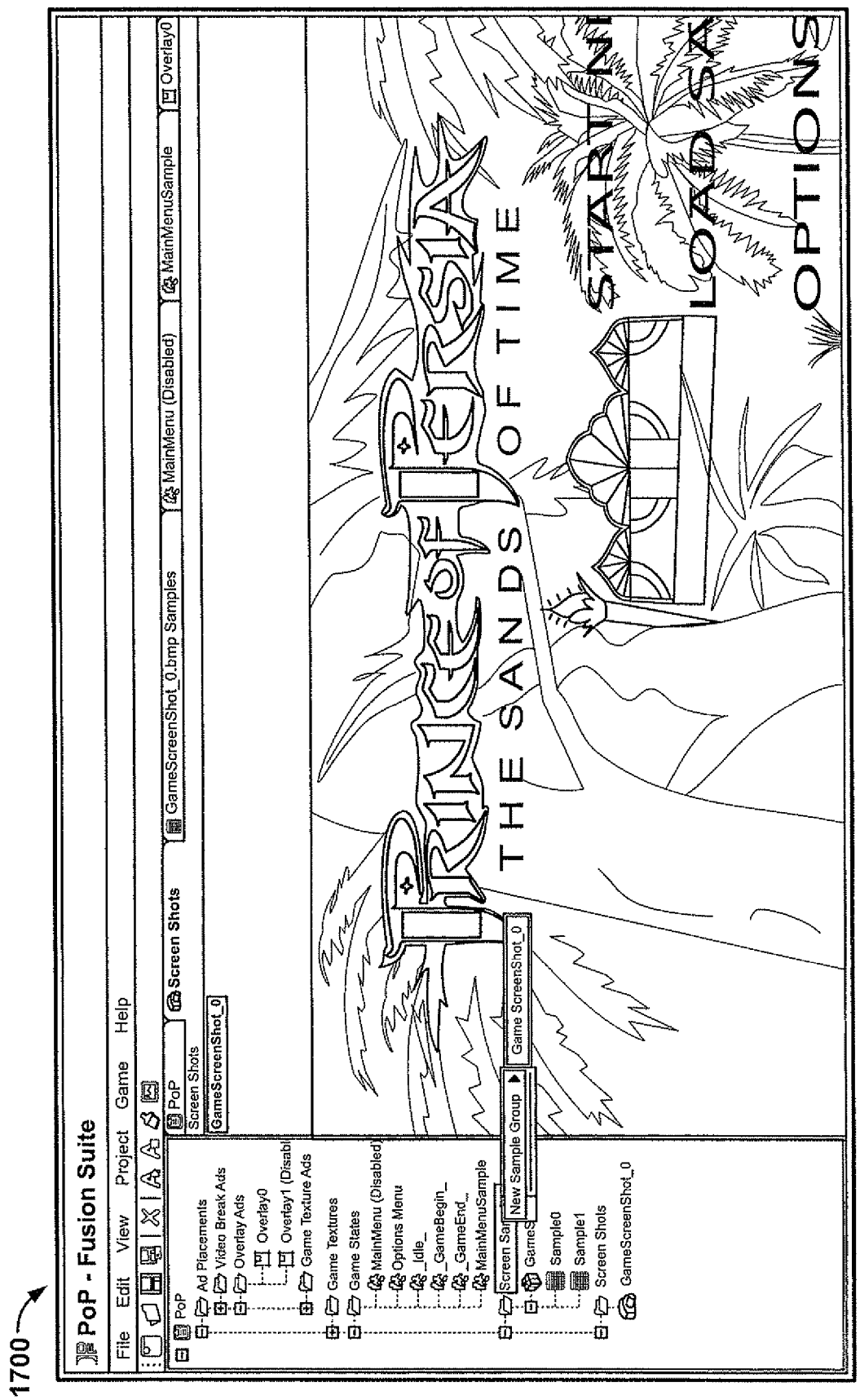
Figure 17B:
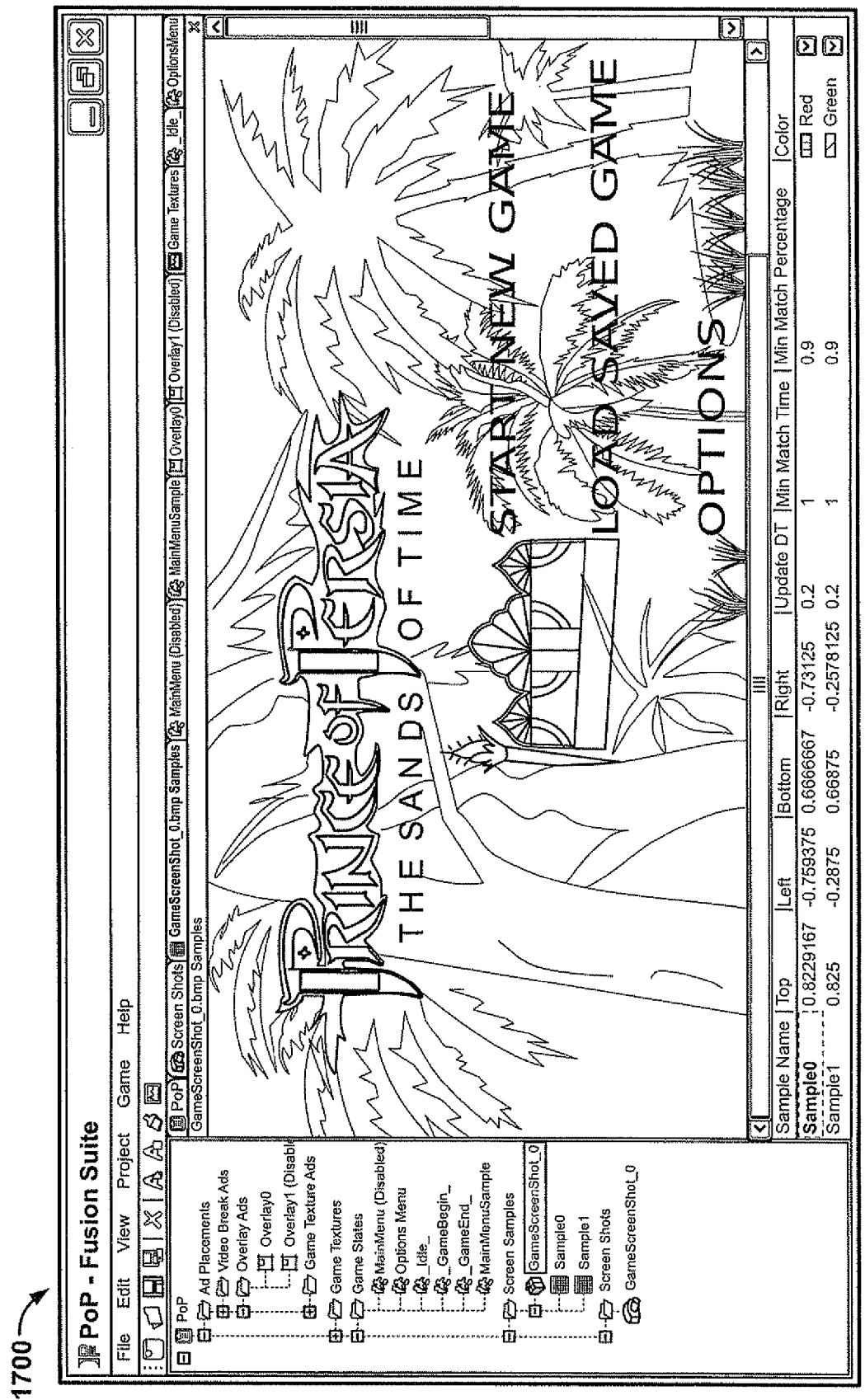

Sample detection may be used when texture detection will not be effective, for example, when a game uses a direct draw technology or uses directx 7 or less. For example, when using sample detection a state may be detected when a pre-defined screen sample appears. To create a sample group, the operator may play the game from within the RTI tool and take a screenshot of the relevant screen. After the screenshot is taken the operator may use the RTI tool to define the screen samples. FIGS. 17A-B show an exemplary window at different times in this process. For example, the operator may right click on the sample group and choose New Screen Sample. Then, the operator may drag a box on the screen to automatically add the relevant parameters (Top, Left, Bottom and Right) to the chosen sample. After defining the sample the operator may fill in the following fields:

(1) Update DT: a value representing an amount of time that will pass before the engine will try to detect the sample in the screen, in seconds or other unit.

(2) Min Match Time: a value used to determine for how long the engine will compare the game screen to the screen shot sample, in seconds or other unit.

(3) Min Match Percentage: a value used to determine the accuracy of the comparison done by the engine between the game screen and the screen sample. A higher percentage may be used if the state is detected in places where the operator didn't intend it to be.

Once the operator is finished adding all the samples to the group, the operator may define a state which will use the sample group for its detection. This process is similar to the state definition process when using texture detection except the data used to define a new state.

After defining the different game states and their detection rules, ad-objects or other creative objects may be added. The RTI engine allows the operator to add three types of ad objects: Overlays, Videos and Textures.

Overlays are floating ads that are displayed on screen. The RTI application may provide various editing and production tools to prepare floating ads and integrate completed ads into the system. A default creative may be specified for display when then there is no campaign assigned to a particular ad placement.

Videos can be displayed during various game breaks. In order to add a video ad object the operator may right click on the "Video Break Ads" folder in the project tree and choose "New Video Break". The RTI tool may provide an interface for defining video properties and integration with game graphics, as well. The operator also identifies events that will trigger playing of the video or overlay.

One of the most powerful features provided by RTI may be the ability to change a game texture or part of it into an ad placement. There are two advantages in using texture changing. The first advantage is that the ads may be configured to resemble originally-authored portions of the game. The second advantage is that using changed in-game textures for state detection may eliminate the need for the operator to define states, thus removing the risk of an ad placement appearing in the wrong section of the game because of a wrong state definition.

A texture ad may be created using a texture editing tool. After creating the texture ad it may be integrated into the alteration engine by specifying the following fields:

(1) Target Texture: an identifier for an in-game texture which will be replaced by, wholly or partially, by the ad object.

(2) Name: an assigned name for the ad object.

(3) Description: (optional) a textual description of the ad object.

(4) Use Default Creative: A variable used to determine whether or not the default creative (texture) will be displayed when there is no campaign assigned to the ad object.

(5) Default Creative: an identifier for the default creative (texture).

Figure 18A:
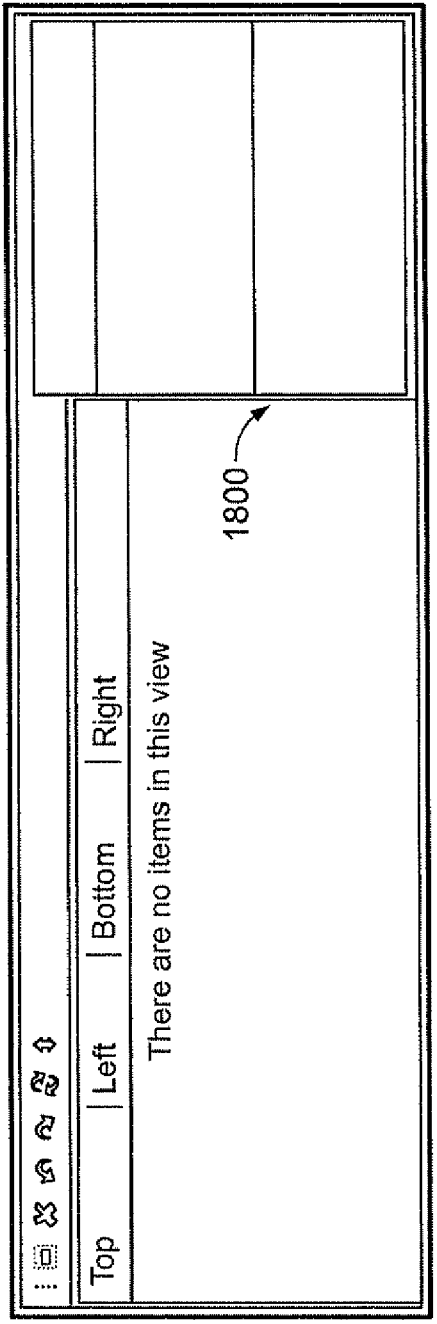
Figure 18B:
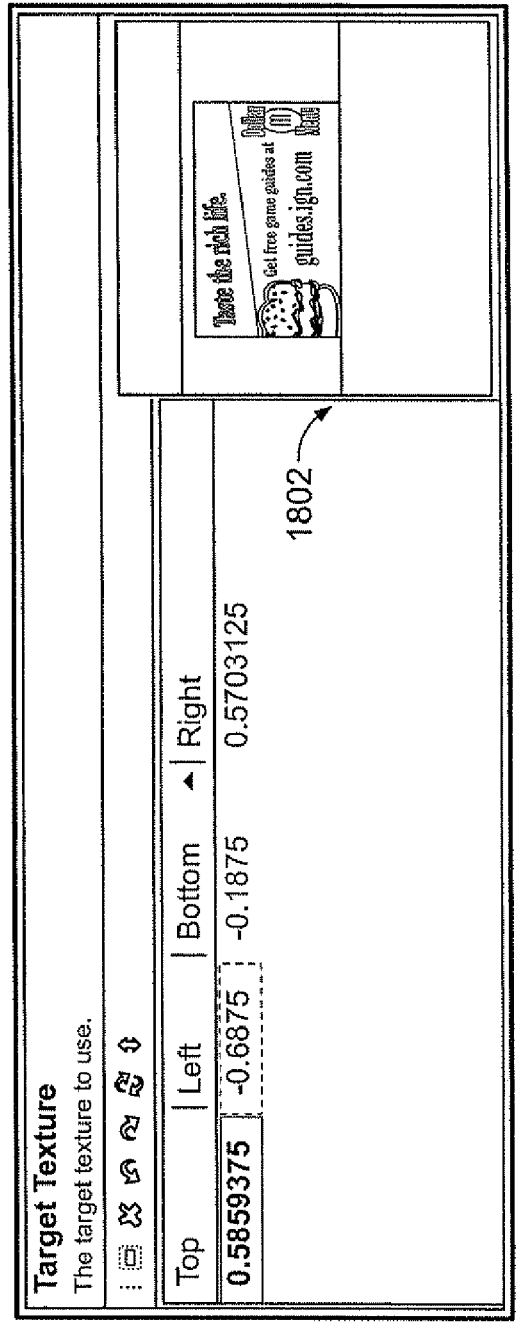

Other data may also be displayed or specified, including but not limited to other characteristics and addresses for the default creative and ad object. As with other types of ads, the operator may be permitted to specify a default texture that will be displayed when then there is no campaign assigned to the ad texture placement. FIG. 18A shows a default texture 1800 in an exemplary screenshot for the RTI tool. FIG. 18B shows an exemplary ad texture 1802 that may replace the default texture. The interface may further provide for specifying a portion of a texture to be replaced, texture orientation, and other parameters controlling appearance of the ad texture during game play.

Having thus described a preferred embodiment of an alteration engine for a game executable, it should be apparent to those skilled in the art that certain advantages of the within system have been achieved. It should also be appreciated that various modifications, adaptations, and alternative embodiments thereof may be made without departing from the scope and spirit of the present technology. For example, use of an alteration engine with computer game executables has been illustrated, but it should be apparent that the novel concepts described above may be applied by one of ordinary skill to other software executables to thereby realize the unexpected benefits described herein. The following claims define the scope of what is claimed.

What is claimed is:

1. A method for causing advertising output from distributed client nodes operating a game program, comprising:

processing a defined executable file of a specified game application to develop an alteration scheme, using a second application, wherein the game application is configured to provide video output on a client node in response to client input as defined by the defined executable file, the defined executable file being capable of independent operation on the client node to provide a video game output without the additional executable code, and the additional executable code being capable of executing independently of the defined executable file;

preparing, using the second application, the additional executable code operable to detect events occurring during operation of the defined executable file on the client node and to perform respective defined actions in response to the events to implement the alteration scheme, wherein the respective defined actions include output of advertising information during operation of the game application; and providing the additional executable code and the advertising information to the client node, whereby the advertising information is output from an output device of the client node during operation of the defined executable file thereon according to alteration scheme data obtained from a separate file located in a memory of the client node.

2. The method of claim 1, wherein preparing the additional executable code comprises configuring an installation executable for installing the additional executable code at the client node, thereby configuring the additional executable code to operate at the client node prior to the defined executable file.

3. The method of claim 2, wherein preparing the additional executable code further comprises including the additional executable code together with the installation executable in a installation file configured for installing on a client node where defined executable file is already installed.

4. The method of claim 1, further comprising providing the alteration scheme data to the client node, the alteration scheme data configured to be used by the additional executable code to identify the respective defined actions to be automatically performed at the client node in response to the events.

5. The method of claim 4, wherein providing the alteration scheme data to the client node is accomplished by providing the alteration scheme data in the file separate from, and capable of being referenced by, the additional executable code.

6. The method of claim 1, further comprising providing a configuration tool operative to receive input used to control preparing the additional executable code.

7. A system for providing independently-defined alteration of output from a software executable, comprising:

a software executable encoded in a computer-readable medium and operable to determine computer game output responsive to user inputs;

an event-monitoring executable encoded in the computer-readable medium independently of the software executable and adapted to detect defined machine events caused by operation of the software executable, and to cause independent computer output determined by cross-reference data located in a separate file and different from what is determined by the software executable in response to detection of the defined machine events, wherein the software executable and the event-monitoring executable are capable of operating independently of one another on a computer.

8. The system of claim 7, further comprising the cross-reference data encoded in the computer-readable medium in a file separate from the software executable and the event-monitoring executable, the cross-reference data defining associations between the defined machine events and different types of the independent computer output.

9. The system of claim 8, wherein the different types of independent computer output in the cross-reference data include displays configured for display over graphical game output.

10. The system of claim 8, wherein the different types of independent computer output in the cross-reference data include graphical rendering textures configured for display in place of graphical rendering textures selected by the software executable.

11. The system of claim 7, wherein the event-monitoring executable is adapted to detect, in response to operation of the software executable, machine events of at least one type selected from: a graphics API call, an audio API call, and presence of a defined graphics texture in a graphics output.

12. The system of claim 7, wherein the event-monitoring executable is configured to cause independent computer output referencing a network address for additional information.

13. The system of claim 12, further comprising a server adapted to provide the additional information in response to requests from remote clients operating the event-monitoring executable.

14. The system of claim 12, further comprising a server adapted to provide, from time to time, updated cross-reference data for encoding in the computer-readable memory in a file separate from the software executable and the event-monitoring executable, the cross-reference data defining associations between the defined machine events and different types of the independent computer output.

* * * * *

UNITED STATES PATENT AND TRADEMARK OFFICE
CERTIFICATE OF CORRECTION

PATENT NO.         : 8,075,398 B2                                     Page 1 of 1
APPLICATION NO.    : 12/194757
DATED              : December 13, 2011
INVENTOR(S)        : James Beser et al.

It is certified that error appears in the above-identified patent and that said Letters Patent is hereby corrected as shown below:

IN THE CLAIMS:

Column 33, Claim 1, line 11, delete "the" immediately following "video game output without"

Signed and Sealed this
First Day of May, 2012

David J. Kappos
*Director of the United States Patent and Trademark Office*